(12) United States Patent
Kojima et al.

(10) Patent No.: US 7,597,389 B2
(45) Date of Patent: Oct. 6, 2009

(54) DAMPER FOR AUTOMOBILE SEAT AND AUTOMOBILE SEAT MECHANISM HAVING THE DAMPER

(75) Inventors: Masamitsu Kojima, Fujisawa (JP); Yoshihiro Harada, Fujisawa (JP); Yoshiteru Igarashi, Fujisawa (JP)

(73) Assignee: Oiles Corporation, Tokyo (JP)

( * ) Notice: Subject to any disclaimer, the term of this patent is extended or adjusted under 35 U.S.C. 154(b) by 487 days.

(21) Appl. No.: 10/556,138

(22) PCT Filed: Feb. 4, 2004

(86) PCT No.: PCT/JP2004/001149
§ 371 (c)(1), (2), (4) Date: Nov. 9, 2005

(87) PCT Pub. No.: WO2004/098944
PCT Pub. Date: Nov. 18, 2004

(65) Prior Publication Data
US 2007/0001357 A1     Jan. 4, 2007

(30) Foreign Application Priority Data
May 12, 2003    (JP) .............................. 2003-133689

(51) Int. Cl.
*B60N 2/10*    (2006.01)
(52) U.S. Cl. .................... 297/15; 297/335; 188/290
(58) Field of Classification Search .................... 297/15, 297/331, 332, 333, 335; 296/65.05; 16/54, 16/438; 188/290, 296, 307
See application file for complete search history.

(56) References Cited

U.S. PATENT DOCUMENTS

| 5,165,507 | A | * | 11/1992 | Ohshima | 188/290 |
| 5,211,269 | A | * | 5/1993 | Ohshima | 188/290 |
| 5,257,852 | A | * | 11/1993 | Tsuneki et al. | 297/332 |
| 5,335,563 | A | * | 8/1994 | Yamamoto et al. | 74/512 |
| 6,041,899 | A | * | 3/2000 | Takamatsu | 188/290 |
| 6,405,410 | B1 | * | 6/2002 | Miho et al. | 16/429 |

(Continued)

FOREIGN PATENT DOCUMENTS

DE    297 21 962 U1    2/1998

(Continued)

OTHER PUBLICATIONS

International Search Report of PCT/JP2004/001149, mailed Jun. 29, 2004.

*Primary Examiner*—David Dunn
*Assistant Examiner*—Patrick Lynch
(74) *Attorney, Agent, or Firm*—Nixon & Vanderhye, PC

(57) ABSTRACT

A damper (2) includes: a fixing member (12); a rotator (11) which is rotatably supported by the fixing member (12) and forms a gap (13) with the fixing member (12); a silicone-based unvulcanized rubber (15) disposed in the gap (13); and a one-way clutch means (16) which, in a lateral rotation (R1) of a rear seat (3) in a lowering direction, is adapted to transmit the lateral rotation (R1) in the lowering direction to the rotator (11) so as to cause the rotator 11 to undergo rotation about an axis X, and which, in the lateral rotation (R1) of the automobile rear seat (3) in a raising direction, is adapted to inhibit the transmission of the lateral rotation (R1) in the raising direction to the rotator (11).

35 Claims, 11 Drawing Sheets

U.S. PATENT DOCUMENTS

| | | | |
|---|---|---|---|
| 6,604,614 B2 * | 8/2003 | Kurihara et al. | 188/290 |
| 6,843,526 B2 * | 1/2005 | Honda et al. | 297/14 |
| 2002/0109386 A1 * | 8/2002 | Kojima et al. | 297/354.12 |
| 2003/0184129 A1 * | 10/2003 | Honda et al. | 297/14 |

FOREIGN PATENT DOCUMENTS

| | | |
|---|---|---|
| EP | 0 540 298 A1 | 5/1993 |
| JP | 5-229411 | 9/1993 |
| JP | 05-229411 A | 9/1993 |
| JP | 8-142725 | 6/1996 |
| JP | 08-142725 A | 6/1996 |
| JP | 2002-321553 | 11/2002 |
| JP | 2002-321553 A | 11/2002 |

\* cited by examiner

F I G. 6
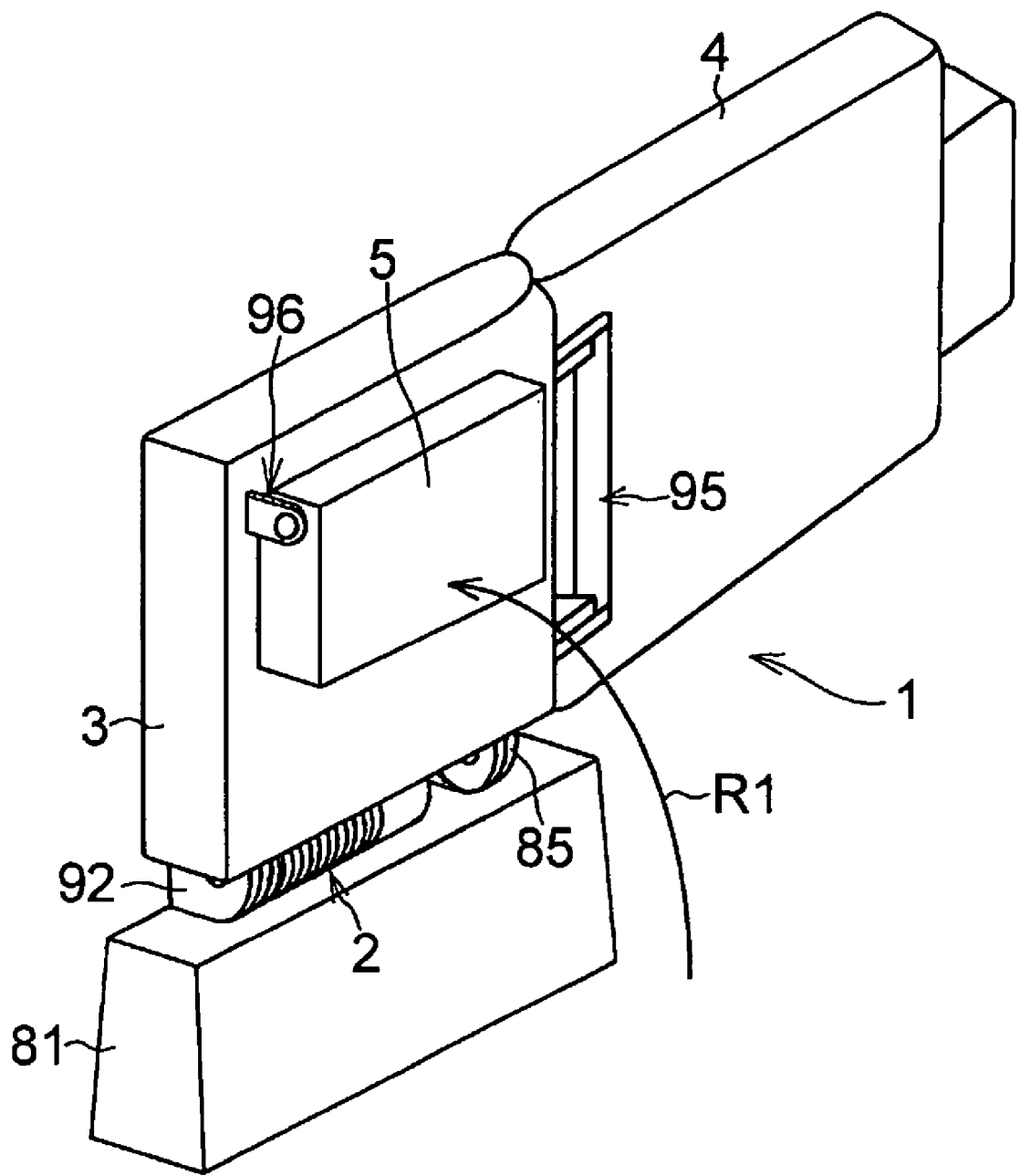

DAMPER FOR AUTOMOBILE SEAT AND AUTOMOBILE SEAT MECHANISM HAVING THE DAMPER

This application is the U.S. national phase of international application PCT/JP2004/001149, filed 4 Feb. 2004, which designated the U.S. and claims benefit of JP 2003-133689, dated 12 May 2003, the entire contents of each of which are hereby incorporated by reference.

TECHNICAL FIELD

The present invention relates to a damper for an automobile seat which makes it possible to eliminate the sudden returning of an automobile seat, e.g., a rear seat which is rotatable in a lateral direction, by absorbing the rotational energy in the return of the rear seat which has been sprung up in the lateral direction, as well as an automobile seat mechanism having the damper.

BACKGROUND ART

In an automobile, it has been proposed to allow a rear seat to be sprung up in a lateral direction so as to make the space inside a vehicle compartment large. In the case where such a rear seat is sprung up in a lateral direction (in the case of lateral rotation in a raising direction), even if a slightly large force is applied, the self weight of the rear seat acts, so that the problem of a violent collision against a stopper and the like does not occur so much. However, in the case where the rear seat is returned to its original state (in the case of lateral rotation in a lowering direction), the rear seat is suddenly lowered in the lateral direction due to the effect of the self weight of the rear seat and violently collides against the stopper and the like, generating a large unpleasant noise. To allow the lateral rotation in the lowering direction of this rear seat to be effected slowly, it is sufficient to use a damper for absorbing the lateral rotational energy. As such a damper, one using a fluid is known, and with this damper using the fluid, the damper must inevitably become large-sized in order to obtain a large damping force, and a large-scale seal is required to prevent the leakage of the fluid. Particularly in the case of a damper for an automobile seat mechanism in which a backrest is arranged to be extended with respect to the rear seat by rotating the backrest in a backward direction with respect to the rear seat, and the rear seat is subsequently arranged to be sprung up in the lateral direction so as to secure an accommodating space inside the vehicle compartment, it is necessary to damp large rotational energy based on the total load of the backrest and the rear seat. Therefore, with a compact damper which merely makes use of a fluid, it is difficult to obtain the targeted large attenuation.

DISCLOSURE OF THE INVENTION

The present invention has been devised in view of the above-described aspects, and its object is to provide a damper which is suitable as an automobile seat and which is capable of obtaining a large damping force and can be made compact, and in which, in particular, the backrest is extended or the backrest is folded, and subsequently the seat is sprung up laterally, or the seat is rotated backward, as well as an automobile seat mechanism having the damper.

A damper for an automobile seat according to a first aspect of the invention comprises: a fixing member adapted to be fixed to a chassis on which an automobile seat is rotatably installed; a rotator which is rotatable relative to the fixing member and forms a gap with the fixing member; a silicone-based unvulcanized rubber disposed in the gap; and a one-way clutch means which, in the rotation of the automobile seat in one direction, is adapted to transmit the rotation in the one direction to the rotator, and which, in the rotation of the automobile seat in another direction, is adapted to inhibit the transmission of the rotation in the other direction to the rotator.

In accordance with the damper according to the first aspect, the rotation of the rotator with respect to the fixing member causes shear deformation in the silicone-based unvulcanized rubber, and the damping function is obtained by this shear deformation. Therefore, there is no possibility of wear, the seal for leakage prevention can be omitted, and it is possible to easily obtain a large damping force even with a lightweight and compact damper. Moreover, the one-way clutch means ensures that the damping function based on the silicone-based unvulcanized rubber is not produced in the rotation in one direction of the automobile seat, e.g., in the springing-up lateral rotation of the seat or the forward returning rotation of the seat, while the damping function based on the silicone-based unvulcanized rubber is produced in the rotation in another direction of the automobile seat, e.g., in the returning and lowering lateral rotation of the seat or the backwardly reclining and lowering rotation of the seat. Therefore, the springing up or forward returning of the automobile seat can be effected easily, and the generation of a large unpleasant noise due to a violent collision against a stopper or the like does not occur in the returning and lowering lateral rotation of the seat or the backwardly reclining and lowering rotation of the seat.

In accordance with the damper for an automobile seat according to a second aspect of the invention, in the damper according to the above-described first aspect, the fixing member is adapted to be fixed to the chassis on which the automobile seat is installed rotatably in raising and lowering directions, and wherein in the lateral rotation of the automobile seat in the lowering direction, the one-way clutch means is adapted to transmit the lateral rotation in the lowering direction to the rotator so as to cause the rotator to rotate, whereas in the lateral rotation of the automobile seat in the raising direction, the one-way clutch means is adapted to inhibit the transmission of the lateral rotation in the raising direction to the rotator. In accordance with the damper for an automobile seat according to a third aspect of the invention, in the damper according to the above-described first aspect, the fixing member is adapted to be fixed to the chassis on which the automobile seat is installed rotatably in back-and-forth directions, and wherein in the backward rotation of the automobile seat, the one-way clutch means is adapted to transmit the backward rotation to the rotator so as to cause the rotator to rotate, whereas in the forward rotation of the automobile seat, the one-way clutch means is adapted to inhibit the transmission of the forward rotation to the rotator.

In the damper according to any one of the above-described aspects, as in the damper for an automobile seat according to a fourth aspect of the invention, the rotator may have a central shaft portion and a plurality of hollow cylindrical portions disposed concentrically with the central shaft portion, and the fixing member may have a plurality of hollow cylindrical portions disposed concentrically with the central shaft portion and, at the hollow cylindrical portion on an innermost peripheral side among the plurality of hollow cylindrical portions, is fitted slidably over the central shaft portion to rotatably support the rotator. Further, the plurality of hollow cylindrical portions of the rotator and the plurality of hollow cylindrical portions of the fixing member may be overlappingly fitted to each other in a radial direction with the gap in which the silicone-based unvulcanized rubber is disposed. In this case, as in the damper for an automobile seat according to a fifth aspect of the invention, preferably, the rotator has a closure portion formed integrally with respective one axial end portions of the plurality of hollow cylindrical portions and a recess or a projection provided in or on an axial end face of the closure portion, and the fixing member has a closure portion formed integrally with one axial end portions of the hollow cylindrical portions and a mounting portion formed integrally with the closure portion and adapted to be fixed to the chassis.

If the rotator has a recess or a projection and the fixing member has a mounting portion as in the damper according to the fifth aspect, the damper can be supported at its both ends by the recess or the projection and the mounting portion, with the result that the damper can be firmly fixed to the chassis.

In the damper according to any one of the above-described first to third aspects, as in the damper for an automobile seat according to a sixth aspect of the invention, the fixing member may be constituted by two members, one of the members having a central shaft portion and a plurality of hollow cylindrical portions disposed concentrically on the one axial end portion side of the central shaft portion, another one of the members having a plurality of other hollow cylindrical portions disposed concentrically on another axial end portion side of the central shaft portion. Further, the hollow cylindrical portion on an innermost peripheral side among the plurality of other hollow cylindrical portions may be fittingly secured in the other axial end portion of the central shaft portion. Further, the rotator may include two sets of pluralities of hollow cylindrical portions disposed concentrically with the central shaft portion and arranged in an axial direction and a closure portion disposed between the two sets of pluralities of hollow cylindrical portions and formed integrally with respective ones of the two sets of pluralities of hollow cylindrical portions, the rotator being supported rotatably by the central shaft portion between the two members of the fixing member. Further, both pluralities of hollow cylindrical portions of the fixing member and the two sets of pluralities of hollow cylindrical portions may be overlappingly fitted to each other in the radial direction with the gap in which the silicone-based unvulcanized rubber is disposed. In this case, as in the damper for an automobile seat according to a seventh aspect of the invention, the one member of the fixing member has a closure portion formed integrally with the one axial end portion of the central shaft portion and respective one axial end portions of the plurality of hollow cylindrical portions, as well as a mounting portion formed integrally with the closure portion so as to be fixed to the chassis, and the other member of the fixing member has another closure portion formed integrally with the respective one axial end portions of the plurality of hollow cylindrical portions, as well as a recess or a projection provided in or on an axial end face of the closure portion.

If the fixing member has a mounting portion and a recess or a projection as in the damper according to the seventh aspect, the damper can be supported at its both ends by the mounting portion and the recess or the projection, with the result that the damper can be firmly fixed to the chassis in the same way as the damper according to the fifth embodiment.

In the invention, as in the damper according to its eighth embodiment, the one-way clutch means may have a coil spring whose one end portion is formed as a free end and wound around a cylindrical outer peripheral surface of the rotator and whose other end portion is adapted to be attached to an automobile rear seat.

In accordance with the damper according to the eighth aspect, since the one-way clutch means has a coil spring wound around the outer peripheral surface of the rotator, by virtue of the action of the one-way clutch means based on the enlargement and reduction in diameter of such a coil spring, it is ensured that the damping function based on the silicone-based unvulcanized rubber is not produced in the rotation in the one direction of the automobile seat, while the damping function based on the silicone-based unvulcanized rubber can be produced in the rotation in the other direction of the automobile seat. Therefore, by virtue of a very simple mechanism, it can be ensured that the springing up or forward returning of the automobile seat, for instance, can be effected easily, and the generation of a large unpleasant noise due to a violent collision against a stopper or the like does not occur in the returning and lowering lateral rotation of the seat or the backwardly reclining and lowering rotation of the seat.

In the damper according to any one of the above-described first to third aspects, as in the damper for an automobile seat according to a ninth aspect of the invention, the fixing member may include a housing member and a cover member which is threadedly secured or fittingly secured to the housing member. Further, the housing member may include an outer hollow cylindrical portion, an inner hollow cylindrical portion disposed concentrically with the outer hollow cylindrical portion on an inner side of the outer hollow cylindrical portion, and a closure portion formed integrally on the outer hollow cylindrical portion and the inner hollow cylindrical portion so as to close one axial end portions of the outer hollow cylindrical portion and the inner hollow cylindrical portion. Further, the cover member may be threadedly secured or fittingly secured to another axial end portion of the outer hollow cylindrical portion. Further, the rotator may include an outer peripheral hollow cylindrical portion disposed concentrically with the outer hollow cylindrical portion on an inner side of the outer hollow cylindrical portion and on an outer side of the inner hollow cylindrical portion, an inner peripheral hollow cylindrical portion connected to the outer peripheral hollow cylindrical portion and disposed concentrically with the outer peripheral hollow cylindrical portion on an inner side of the inner hollow cylindrical portion. Further, the outer peripheral hollow cylindrical portion and at least one of the outer hollow cylindrical portion and the inner hollow cylindrical portion may be overlappingly fitted to each other in the radial direction with the gap in which the silicone-based unvulcanized rubber is disposed. In such a damper for an automobile seat according to the ninth aspect, as in the damper for an automobile seat according to a 10th aspect of the invention, the rotator may further include an intermediate hollow cylindrical portion disposed intermediate between the outer peripheral hollow cylindrical portion and the inner peripheral hollow cylindrical portion on the inner side of the inner hollow cylindrical portion, and the intermediate hollow cylindrical portion and the inner hollow cylindrical portion may be overlappingly fitted to each other in the radial direction with a gap in which said silicone-based unvulcanized rubber is disposed.

In the damper according to the ninth or 10th aspect, as in the damper for an automobile seat according to an 11th aspect of the invention, the one-way clutch means may include a hollow cylindrical body juxtaposed to the inner peripheral hollow cylindrical portion in the axial direction, as well as a coil spring having one end portion formed as a free end and wound around respective outer peripheral surfaces of the inner peripheral hollow cylindrical portion and the hollow cylindrical body. In this case, as in the damper for an automobile seat according to a 12th aspect of the invention, the hollow cylindrical body may have on an inner peripheral surface thereof a pair of flat surfaces which oppose each other, so as to engage a shaft member which is inserted into an interior thereof and to be rotated together with the shaft member, or as in the damper for an automobile seat according to a 13th aspect of the invention, the hollow cylindrical body may have a slit extending from one annular end face thereof to another annular end face thereof in the axial direction and which is capable of undergoing a reduction in diameter, so that the hollow cylindrical body can be rotated together with the shaft member by tightening the shaft member inserted in the interior thereof.

In the damper according to any one of the above-described 11th to 13th aspects, the coil spring may be connected at its other end portion to the hollow cylindrical body. However, as in the damper for an automobile seat according to a 14th aspect of the invention, the coil spring may have an inside diameter of such a measure as to tighten the hollow cylindrical body, and the other end portion thereof may be also formed as a free end. In addition, in the damper according to the 11th aspect, as in the damper for an automobile seat according to a 15th aspect of the invention, the coil spring may be connected at the other end portion thereof to the rotator, and may have such an inside diameter that the coil spring tightens the shaft member inserted in the interior thereof, and that the one end portion which is the free end thereof is rotated together with the shaft member.

In the invention, the silicone-based unvulcanized rubber is sufficient if it has a degree of plasticity of 30 to 420 as in the damper for an automobile seat according to a 16th aspect of the invention. Preferably, the silicone-based unvulcanized rubber has a degree of plasticity of 60 to 320 as in the damper for an automobile seat according to a 17th aspect of the invention. More preferably, the silicone-based unvulcanized rubber has a degree of plasticity of 160 to 320 as in the damper for an automobile seat according to an 18th aspect of the invention.

The degree of plasticity of the silicone-based unvulcanized rubber is a value measured by a Williams plastometer standardized by ASTM and the like. Specifically, a silicone-based unvulcanized rubber having a cylindrical shape with a diameter of about 1.43 cm and a height of 1.27 cm and having a volume of 2 cc is clamped by two upper and lower parallel plates and is compressed by a load of 5 kg at 70° C. to 100° C., and the degree of plasticity is expressed by the height (mm/100) of the silicone-based unvulcanized rubber after pressurization for 3 minutes.

In the invention, the silicone-based unvulcanized rubber is sufficient if it has a degree of plasticity of 30 to 420, as described above. However, if it has a degree of plasticity smaller than 30, the silicone-based unvulcanized rubber is likely to flow, so that an exaggerated seal for preventing leakage is required for the silicone-based unvulcanized rubber disposed in the gap, and it becomes difficult to expect a large damping force. If the degree of plasticity is greater than 420, the affinity with the respective surfaces of the rotator and the fixing member forming the gap is practically lost, and one of the rotator and the fixing member slips with respect to the silicone-based unvulcanized rubber in the mutual relative rotation of the rotator and the fixing member, making it difficult to obtain a substantial damping force based on the deformation of the silicone-based unvulcanized rubber. In addition, even if an attempt is made to form the surfaces of the rotator and the fixing member in contact with such a silicone-based unvulcanized rubber into uneven surfaces so as to grip the silicone-based unvulcanized rubber, since the silicone-based unvulcanized rubber having a degree of plasticity of greater than 420 is extremely brittle, the silicone-based unvulcanized rubber is easily sheared (torn apart) in the mutual relative rotation of the rotator and the fixing member. This also makes it impossible to obtain the damping force based on the deformation of the silicone-based unvulcanized rubber.

In addition, although the silicone-based unvulcanized rubber is filled in the gap between the rotator and the fixing member, if its degree of plasticity is greater than 420, it becomes extremely difficult to fill the silicone-based unvulcanized rubber without a cavity (an unfilled portion) in the gap. If the cavity is formed between the rotator and the fixing member, on the one hand, and the silicone-based unvulcanized rubber, on the other hand, there is a possibility that a desired attenuation cannot be obtained.

From the above-described viewpoints of the nonrequirement of the seal, the affinity, brittleness, the ease of filling, durability, and the like, the degree of plasticity of the silicone-based unvulcanized rubber is preferably 60 to 320, more preferably 160 to 320, as described above. If the degree of plasticity is not less than 60, the fluidity of the silicone-based unvulcanized rubber practically disappears, and the leakage of the silicone-based unvulcanized rubber can be prevented with a simple seal mechanism. If the degree of plasticity is not less than 160, the seal mechanism can be practically omitted, and a relatively large damping force can be obtained. On the other hand, if the degree of plasticity of the silicone-based unvulcanized rubber is greater than 420, the affinity with the contact surfaces of the rotator and the fixing member is lost, and the silicone-based unvulcanized rubber becomes brittle and is easily sheared, as described above. However, with the silicone-based unvulcanized rubber having a degree of plasticity of not more than 320, the affinity with the respective surfaces of the rotator and the fixing member improves, and deformation occurs in the silicone-based unvulcanized rubber without slipping so much with respect to the respective surfaces of the rotator and the fixing member in the mutual relative rotation of the rotator and the fixing member, thereby making it possible to easily obtain the targeted attenuation. Moreover, the brittleness disappears, the silicone-based unvulcanized rubber is favorably deformed plastically in correspondence with the mutual relative rotation of the rotator and the fixing member, and even if the rotator and the fixing member on which the uneven surfaces for gripping the silicone-based unvulcanized rubber are formed is used, it is possible to obviate a situation in which the silicone-based unvulcanized rubber is sheared into pieces.

In addition, in the invention, although, as the silicone-based unvulcanized rubber, one having the aforementioned degree of plasticity is preferable, the silicone-based unvulcanized rubber may have, instead of such a degree of plasticity, a Mooney viscosity of 10 to 150 ML 1+4(100° C.) as in the damper for an automobile seat according to its 19th aspect. Preferably, however, the silicone-based unvulcanized rubber may have a Mooney viscosity of 36 to 72 ML 1+4(100° C.) as in the damper for an automobile seat according to a 20th aspect of the invention. More preferably, the silicone-based unvulcanized rubber may have a Mooney viscosity of 66 to 72 ML 1+4(100° C.) as in the damper for an automobile seat according to a 21st aspect of the invention.

In the same way as the silicone-based unvulcanized rubber having the aforementioned degree of plasticity, if the silicone-based unvulcanized rubber has a Mooney viscosity of less than 10 to ML 1+4(100° C.), the silicone-based unvulcanized rubber is likely to flow, so that an exaggerated seal for preventing leakage is required for the silicone-based unvulcanized rubber disposed in the gap, and it becomes difficult to expect a large damping force. If the silicone-based unvulcanized rubber has the Mooney viscosity which exceeds 150 to ML 1+4(100° C.), the affinity with the respective surfaces of the rotator and the fixing member forming the gap is practically lost, and the rotator and the fixing member slip with respect to the silicone-based unvulcanized rubber in the mutual relative rotation of the rotator and the fixing member, making it difficult to obtain a substantial damping force based on the deformation of the silicone-based unvulcanized rubber. In addition, to prevent the rotator and the fixing member to slip, even if an attempt is made to form the surfaces of the rotator and the fixing member in contact with such a silicone-based unvulcanized rubber into uneven surfaces so as to grip the silicone-based unvulcanized rubber, since the silicone-based unvulcanized rubber having a Mooney viscosity of greater than 150 ML 1+4(100° C.) is extremely brittle, the silicone-based unvulcanized rubber is easily sheared (torn apart) in the mutual relative rotation of the rotator and the fixing member. This also makes it impossible to obtain the damping force based on the deformation of the silicone-based unvulcanized rubber. From the above-described viewpoints of the nonrequirement of the seal, the affinity, brittleness, the ease of filling, durability, and the like, the silicone-based unvulcanized rubber has preferably a Mooney viscosity of 36 to 72 ML 1+4(100° C.), more preferably a Mooney viscosity of 66 to 72 ML 1+4(100° C.).

In the invention, as in the damper for an automobile seat according to its 22nd aspect, the silicone-based unvulcanized rubber is constituted by a silicone-modified ethylene propylene rubber.

If the silicone-based unvulcanized rubber is constituted by a silicone-modified ethylene propylene rubber, the silicone-based unvulcanized rubber excels in the durability and weather resistance, and it is possible to provide a desirable damper for an automobile seat.

In the invention, the rotator and the fixing member have uneven surfaces in contact with the silicone-based unvulcanized rubber, and these uneven surfaces may be adapted to prevent the slippage with respect to the uneven surfaces of the silicone-based unvulcanized rubber in the vicinities of the uneven surfaces in the relative rotation of the rotator and the fixing member. The uneven surfaces may be embodied by discretely arranged projections or U-grooves or continuous projections or U-grooves, or may be embodied by satin finished surfaces or crimped uneven surfaces.

Such uneven surfaces function to grip the silicone-based unvulcanized rubber in the vicinities of the uneven surfaces, with the result that it is possible to prevent the slippage between the rotator and the fixing member, on the one hand, and the silicone-based unvulcanized rubber, on the other hand, in the relative rotation between the rotator and the fixing member. Thus, desired plastic deformation is caused in the silicone-based unvulcanized rubber, thereby allowing the silicone-based unvulcanized rubber to absorb the targeted energy. In a case where the silicone-based unvulcanized rubber and the surfaces of the rotator and the fixing member in contact therewith exhibit good affinity, and the slippage does not occur between the rotator and the fixing member, on the one hand, and the silicone-based unvulcanized rubber, on the other hand, or in a case where the slippage is allowed, flat smooth surfaces may be formed without forming such uneven surfaces.

An automobile seat mechanism according to a first aspect of the invention comprises: the damper for an automobile seat according to any one of the aforementioned aspects; a seat provided rotatably with respect to the automobile chassis; and a backrest provided rotatably with respect to the seat.

In accordance with the automobile seat mechanism according to such a first aspect, since the damping function is obtained by the silicone-based unvulcanized rubber, it is possible to obtain the effect based on the above-described damper and eliminate the sudden returning or sudden backward reclining of the seat, e.g., the rear seat. It should be noted that the damper and the automobile seat mechanism in any one of the above-described aspects in accordance with the invention is applicable to an automobile seat, including the front seat, the rear seat, and the like, but is preferably applied to the rear seat.

In the automobile seat mechanism according to the first aspect, the backrest may be provided rotatably in a backward direction with respect to the seat as in the automobile seat mechanism according to a second aspect of the invention, or may be provided rotatably in a forward direction with respect to the seat as in the automobile seat mechanism according to a third aspect of the invention.

In the automobile seat mechanism according to any one of the first to third aspects, as in the automobile seat mechanism according to a fourth aspect of the invention, the seat is provided rotatably with respect to the automobile chassis through a shaft member disposed in such a manner as to be passed through the damper, and in this case, the shaft member is adapted to be rotated together with the rotation of the seat. In accordance with the automobile seat mechanism according to such a fourth aspect, the damper can be disposed compactly around the shaft member.

According to the invention, it is possible to provide a damper which is suitable as an automobile seat and which is capable of obtaining a large damping force and can be made compact, and in which, in particular, the backrest is extended or the backrest is folded, and subsequently the seat is sprung up laterally or the seat is rotated backward, as well as an automobile seat mechanism having the damper.

Hereafter, a description will be given of the present invention and the mode for carrying out the invention with reference to preferred embodiments shown in the drawings. It should be noted that the present invention is not limited to these embodiments.

BRIEF DESCRIPTION OF THE DRAWINGS

FIG. 6 is a diagram explaining the operation of the embodiment shown in FIG. 4;

BEST MODE FOR CARRYING OUT THE INVENTION

Figure 1:
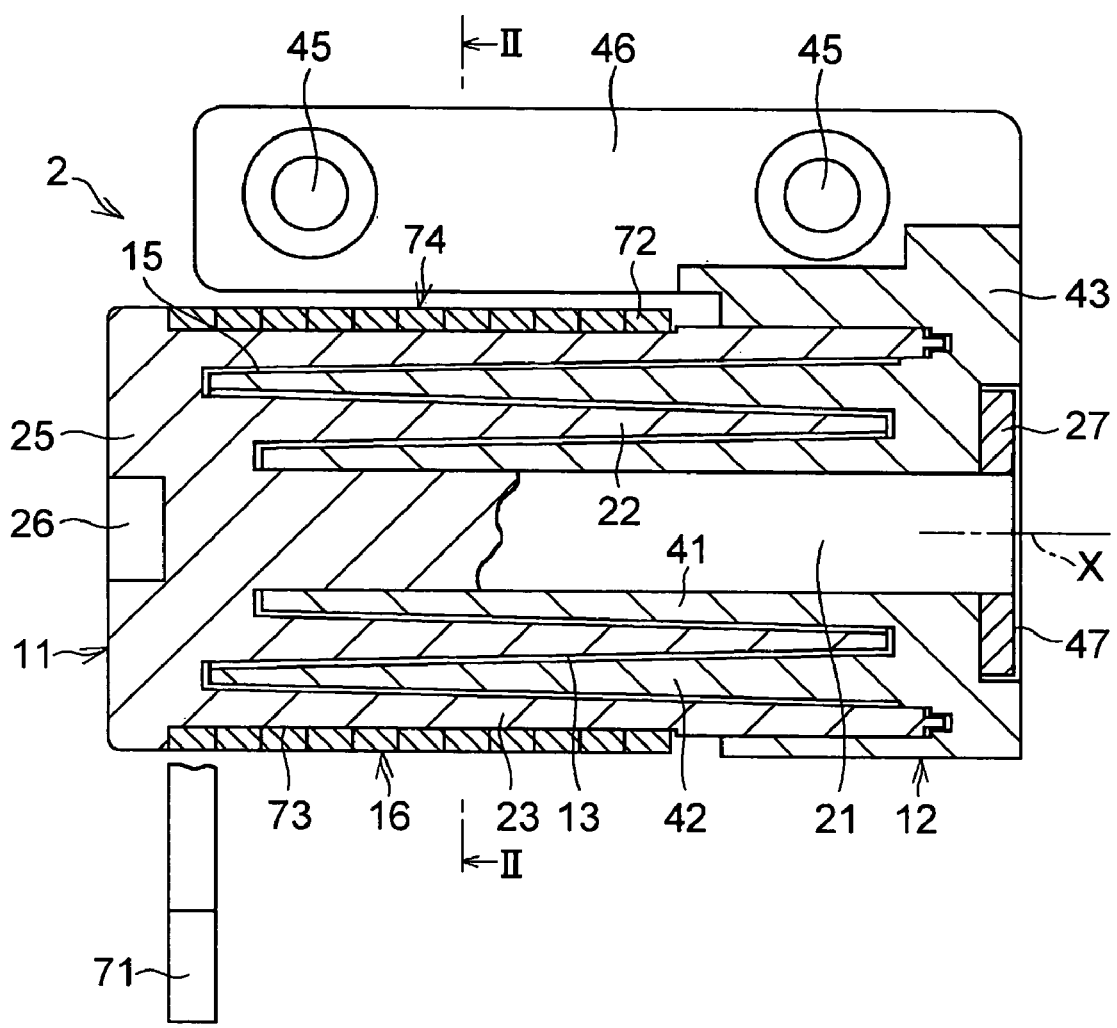
FIG. 1 is an explanatory cross-sectional view of a preferred embodiment of a damper for an automobile seat in accordance with the invention.
Figure 2:
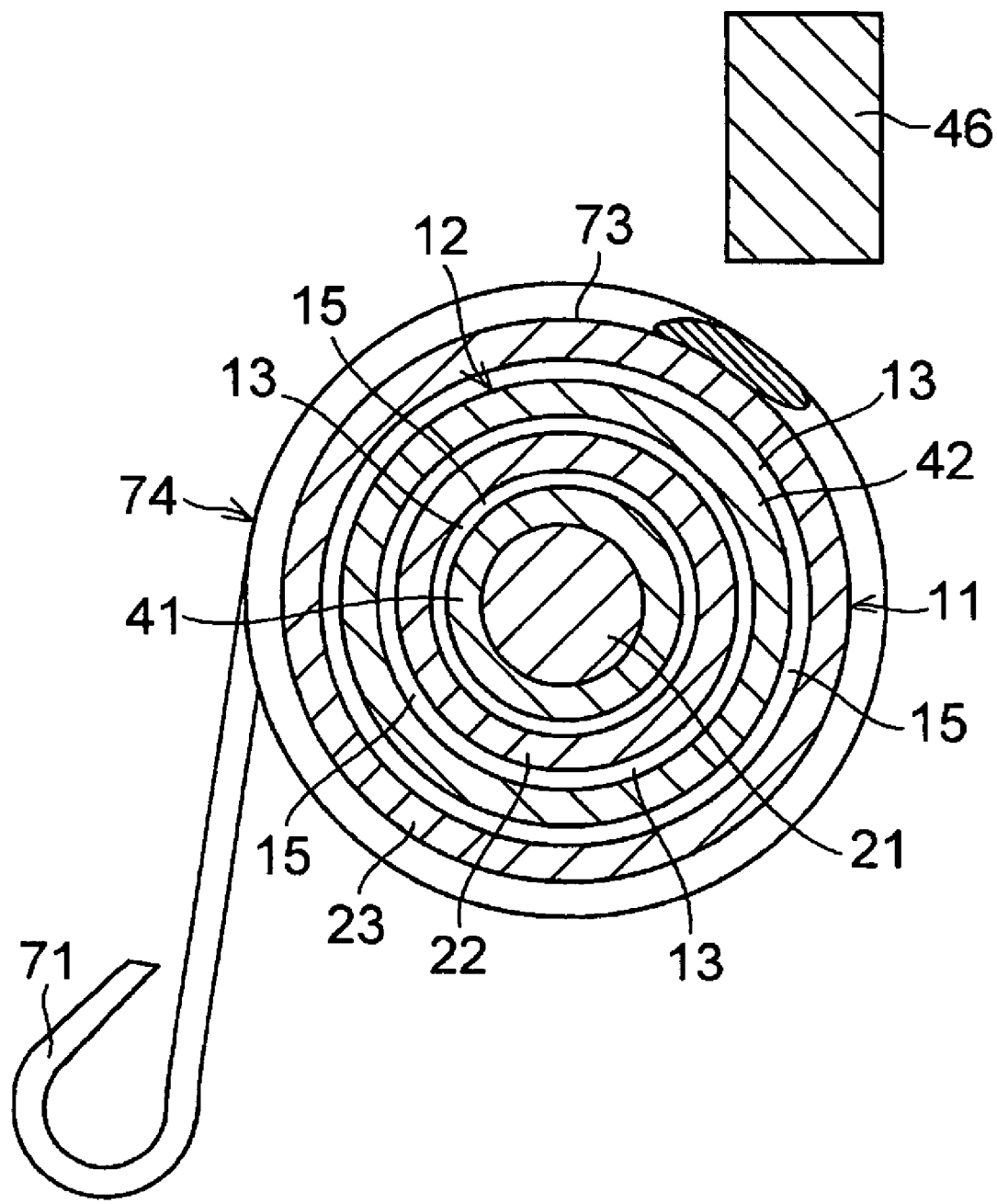
FIG. 2 is a cross-sectional view, taken in the direction of arrows along line II—II, of the embodiment shown in FIG. 1.
Figure 3:
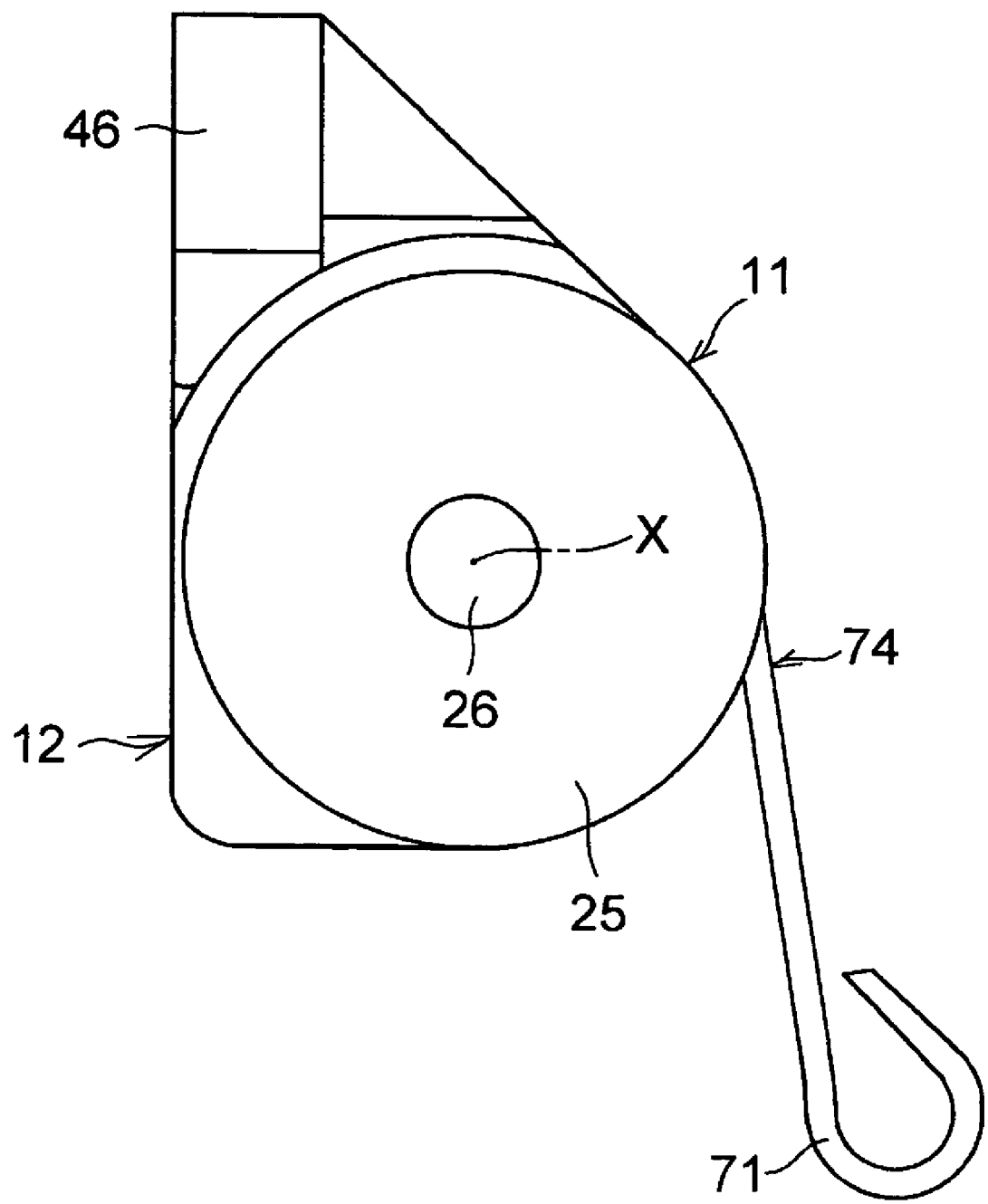
FIG. 3 is a left side view of the embodiment shown in FIG. 1.

In FIGS. 1 to 5, an automobile seat mechanism 1 in accordance with this embodiment is comprised of a damper 2 for an automobile seat; a seat, i.e., a rear seat 3 in this embodiment, which is provided rotatably about an axis X with respect to an automobile chassis in lateral directions in raising and lowering directions, i.e., in directions of lateral rotation R1; a backrest 4 provided rotatably in a backward direction R2 with respect to the rear seat 3; and a leg 5 provided rotatably in a lateral direction R3 with respect to the rear seat 3.

Figure 4:
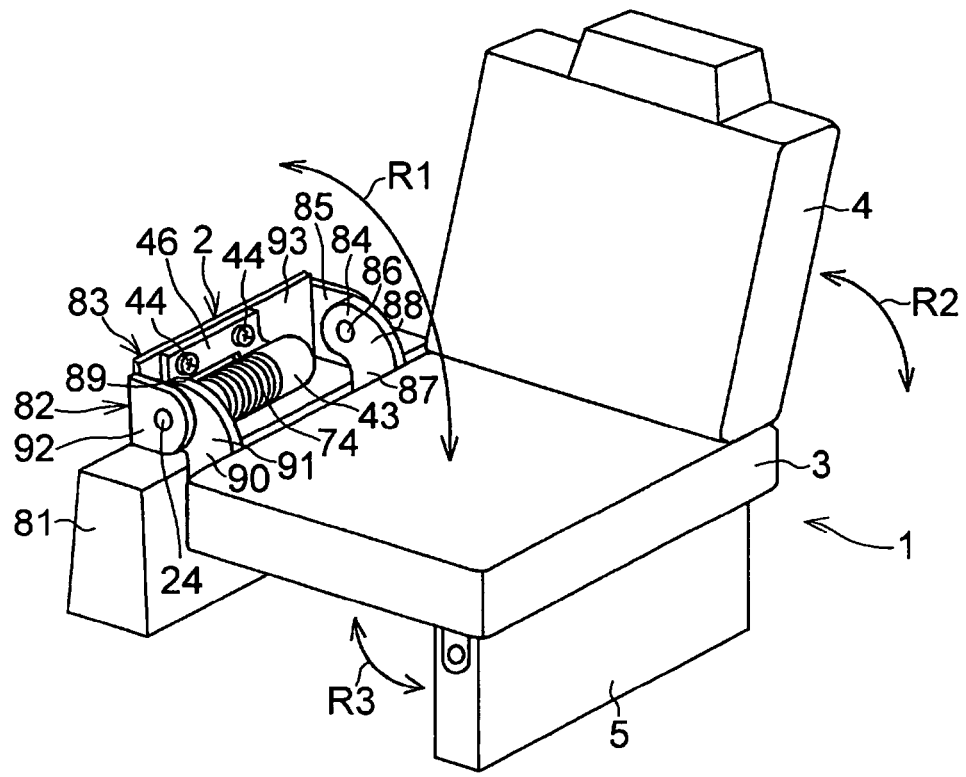
FIG. 4 is a perspective view of an automobile seat mechanism using the embodiment shown in FIG. 1.
Figure 5:
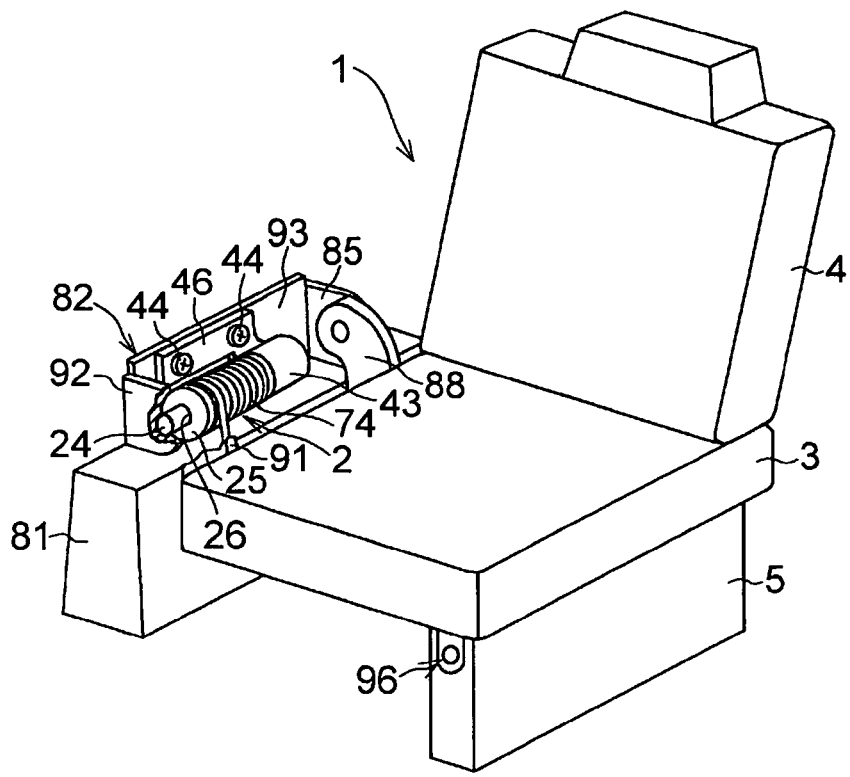
FIG. 5 is a partly cutaway perspective view of the embodiment shown in FIG. 4.

The damper 2 includes a fixing member 12 adapted to be fixed to the chassis on which the rear seat 3 of the automobile is installed rotatably in the directions of the lateral rotation R1; a rotator 11 which is supported by the fixing member 12 rotatably in the directions of the lateral rotation R1 and forms a gap 13 with the fixing member 12, and to which the lateral rotation R1 of the automobile rear seat 3 is adapted to be transmitted through a one-way clutch means 16; a silicone-based unvulcanized rubber 15 disposed in the gap 13; and the one-way clutch means 16 which, in the lateral rotation R1 (the lowering rotation for returning the rear seat 3 to its original position shown in FIGS. 4 and 5) in the lowering direction of the automobile rear seat 3, is adapted to transmit the lateral rotation R1 in the lowering direction to the rotator 11 so as to cause the rotator 11 to undergo rotation about the axis X, and which, in the lateral rotation R1 (the springing-up rotation for bringing the rear seat 3 to the position shown in FIG. 6) in the raising direction of the automobile rear seat 3, is adapted to inhibit the transmission of the lateral rotation R1 in the raising direction to the rotator 11.

The rotator 11 includes a cylindrical central shaft portion 21; a plurality of hollow cylindrical portions 22 and 23 disposed concentrically with the central shaft portion 21; a disk-shaped closure portion 25 formed integrally with respective one axial end portions of the plurality of hollow cylindrical portions 22 and 23 and the central shaft portion 21; a circular recess 26 provided in an axial end face of the closure portion 25; and an annular detent member 27 fitted to the other axial end of the central shaft portion 21.

The fixing member 12 has a plurality of hollow cylindrical portions 41 and 42 disposed concentrically with the central shaft portion 21; a closure portion 43 formed integrally with one axial end portions of the hollow cylindrical portions 41 and 42; a plate-like mounting portion 46 which is formed integrally with the closure portion 43 and having through holes 45 for insertion of fixing bolts 44; and a recess 47 which is formed in the closure portion 43 and in which the detent member 27 is disposed. The fixing member 12 at the hollow cylindrical portion 41 on the innermost peripheral side between the plurality of hollow cylindrical portions 41 and 42 is fitted slidably over the central shaft portion 21, and rotatably supports the rotator 11 to allow the rotator 11 to be rotatable about the axis X.

The plurality of hollow cylindrical portions 22 and 23 of the rotator 11 and the plurality of hollow cylindrical portions 41 and 42 of the fixing member 12 are overlappingly fitted to each other in the radial direction with the gap 13 in which the silicone-based unvulcanized rubber 15 is densely disposed.

The silicone-based unvulcanized rubber 15, which has a Mooney viscosity of 10 to 150 to ML 1+4(100° C.), preferably a Mooney viscosity of 36 to 72 ML 1+4(100° C.), more preferably a Mooney viscosity of 66 to 72 ML 1+4(100° C.), still more preferably a Mooney viscosity of substantially 70 ML 1+4(100° C.) and is constituted by a silicone-modified ethylene propylene rubber, is filled in the gap 13 in close contact with the rotator 11 and the fixing member 12.

The one-way clutch means 16 in accordance with this embodiment, which, in the lateral rotation R1 in the lowering direction of the automobile rear seat 3, transmits the lateral rotation R1 in the lowering direction of the rear seat 3 to the rotator 11 so as to cause the rotator 11 to rotate in the same direction, and which, in the lateral rotation R1 in the raising direction of the automobile rear seat 3, inhibits the transmission of the lateral rotation R1 in the lowering direction of the rear seat 3 to the rotator 11, has a coil spring 74 whose one end portion 72 is formed as a free end is wound around a cylindrical outer peripheral surface 73 of the rotator 11, specifically, the outer peripheral surface 73 of the hollow cylindrical potion 23, and whose other end portion 71 curved in loop form is adapted to be attached to the automobile rear seat 3 through a hinge mechanism 82.

The coil spring 74 is wound with such a winding direction that if the coil spring 74 tends to be rotated in the same direction through the hinge mechanism 82 in the lateral rotation R1 in the raising direction of the automobile rear seat 3, its diameter is enlarged at the portion where the coil spring 74 is in contact with and wound around the outer peripheral surface 73. As a result, the coil spring 74 inhibits the transmission of such a lateral rotation R1 in the raising direction of the rear seat 3 to the rotator 11, so that relative rotation in the direction of the lateral rotation R1 about the axis X will not occur between the rotator 11 and the fixing member 12. Thus, the coil spring 74 ensures that resistance against the lateral rotation R1 in the raising direction of the automobile rear seat 3 due to the shear deformation of the silicone-based unvulcanized rubber 15 will not be produced. On the other hand, the coil spring 74 is wound with such a winding direction that if the coil spring 74 tends to be rotated in the same direction through the hinge mechanism 82 in the lateral rotation R1 in the lowering direction of the automobile rear seat 3, its diameter is reduced at the portion where the coil spring 74 is in contact with and wound around the outer peripheral surface 73. As a result, the coil spring 74 transmits the lateral rotation R1 in the lowering direction of the rear seat 3 to the rotator 11, thereby producing relative rotation in the direction of the lateral rotation R1 about the axis X between the rotator 11 and the fixing member 12. Thus, the coil spring 74 is arranged to produce the resistance against the lateral rotation R1 in the lowering direction of the automobile rear seat 3 due to the shear deformation of the silicone-based unvulcanized rubber 15, thereby allowing the energy of the lateral rotation R1 in the lowering direction of the rear seat 3 to be partially absorbed by the silicone-based unvulcanized rubber 15.

The rear seat 3 is installed on a base 81 secured to the automobile chassis rotatably in the lateral rotation R1 through the damper 2 and the hinge mechanism 82. Thus, the rear seat 3 is provided on the automobile chassis rotatably in the direction of the lateral rotation R1 through the base 81.

The hinge mechanism 82 has a bracket 83 secured to the base 81; one arm member 88 which is connected at one end portion 84 thereof to one bearing portion 85 of the bracket 83 rotatably in the direction of the lateral rotation-R1 through a shaft member 86, and which is secured at the other end portion 87 thereof to the rear seat 3; and another arm member 91 which at one end portion 89 thereof supports a shaft member 24 inserted and secured in the recess 26 of the rotator 11 of the damper 2 rotatably in the directions of the lateral rotation R1, and which is secured at the other end portion 90 thereof to the rear seat 3.

The mounting portion 46 of the fixing member 12 of the damper 2 is secured by the fixing bolts 44 to a mounting portion 93 of the bracket 83 bridging the bearing portions 85 and 92.

The other end portion 71 of the coil spring 74 curved in loop form is secured to the other end portion 90 of the arm member 91 through a mounting pin or the like. Thus, the other end portion 71 is attached to the automobile rear seat 3 through the hinge mechanism 82. The coil spring 74 is adapted to be rotated in the same direction when the rear seat 3 is rotated in the directions of the lateral rotation R1.

The backrest 4 is installed on the rear seat 3 rotatably in the backward direction R2 relative to the rear seat 3 through a known hinge mechanism 95 (see FIG. 6). The leg 5 is also installed on the rear seat 3 rotatably in the lateral direction R3 relative to the rear seat 3 through a known hinge mechanism 96. Since lock mechanisms and the like of the hinge mechanisms 95 and 96 are known, a detailed description thereof will be omitted.

According to the above-described automobile seat mechanism 1 having the damper 2, after the backrest 4 is rotated in the backward direction R2, as shown in FIG. 6, if the rear seat 3 is rotated in the raising direction in the lateral rotation R1, and the leg 5 is rotated in the lateral direction R3 relative to the rear seat 3, it is possible to provide a large accommodating space inside the vehicle compartment.

Further, according to the automobile seat mechanism, in the lateral rotation R1 in the raising direction of the rear seat 3, the coil spring 74 which is rotated in the same direction through the arm member 91 is adapted to undergo enlargement in diameter at the portion where it is in contact with and wound around the outer peripheral surface 73. As a result, the coil spring 74 idles with respect to the outer peripheral surface 73, does not transmit the lateral rotation R1 in the raising direction of the rear seat 3 to the rotator 11, and does not allow the relative rotation in the direction of the lateral rotation R1 about the axis X to be produced between the rotator 11 and the fixing member 12. It is thereby ensured that the damping function based on the silicone-based unvulcanized rubber 15 is not produced; therefore, it is possible to easily effect the springing up of the rear seat 3 in the lateral direction. On the other hand, in the lateral rotation R1 in the lowering direction of the rear seat 3, the coil spring 74 which is rotated in the same direction through the arm member 91 is adapted to undergo shrinkage in diameter at the portion where it is in contact with and wound around the outer peripheral surface 73. As a result, the coil spring 74 is tightly wound around the outer peripheral surface 73, transmits the lateral rotation R1 in the lowering direction of the rear seat 3 to the rotator 11, and allows the relative rotation in the direction of the lateral rotation R1 about the axis X to be produced between the rotator 11 and the fixing member 12. It is thereby ensured that the silicone-based unvulcanized rubber 15 is made to undergo shear deformation, allowing the rotational energy of the rear seat 3 to be absorbed by the shear deformation of the silicone-based unvulcanized rubber 15. Therefore, it is possible to avoid sudden lateral rotation R1 in the returning and lowering direction of the rear seat 3, eliminate the sudden returning of the rear seat 3, and eliminate the generation of a large unpleasant noise due to a violent collision against the stopper or the like.

Further, according to the damper 2, since the damping function is obtained by the shear deformation of the silicone-based unvulcanized rubber 15, there is no possibility of wear, the seal for leakage prevention can be omitted, and it is possible to easily obtain a large damping force even with a lightweight and compact damper. Moreover, the rotator 11 is supported at its recess 26 by the arm member 91 through the shaft member 24, while the fixing member 12 is supported at its mounting portion 46 by the mounting portion 93, such that the damper 2 is supported at its both ends. Therefore, the damper 2 is firmly fixed to the chassis.

Figure 7:
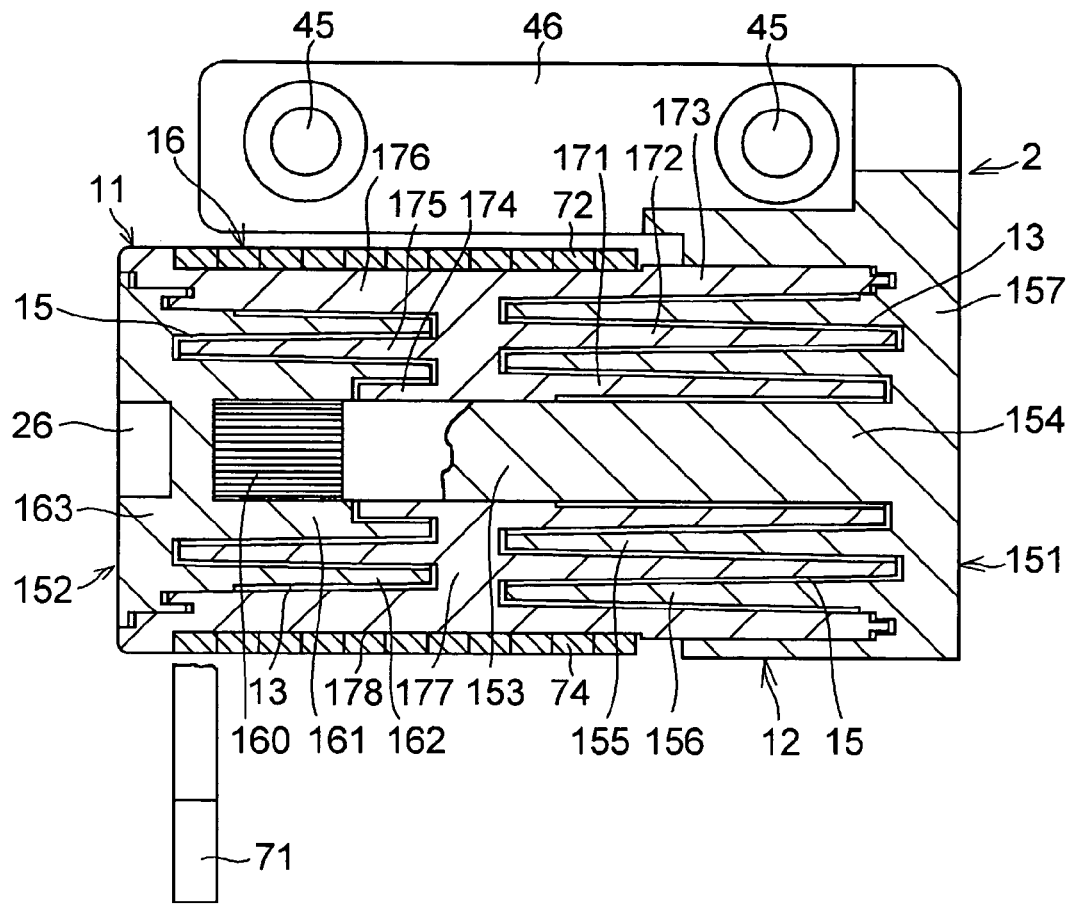
FIG. 7 is an explanatory cross-sectional view of another preferred embodiment of the invention.

With the above-described damper 2, the fixing member 12 is formed by an integral member, but the fixing member 12 may alternatively formed by two members 151 and 152, as shown in FIG. 7. Namely, in the damper 2 shown in FIG. 7, the one member 151 of the fixing member 12 includes a central shaft portion 153; a plurality of hollow cylindrical portions 155 and 156 disposed concentrically with the one axial end portion 154 side of the central shaft portion 153; a closure portion 157 formed integrally with the one axial end portion 154 of the central shaft portion 153 and respective one axial end portions of the plurality of hollow cylindrical portions 155 and 156; and the mounting portion 46 formed integrally with the closure portion 157 so as to be fixed to the chassis. The other member 152 of the fixing member 12 includes a plurality of hollow cylindrical portions 161 and 162 disposed concentrically with the other axial end portion 160 side of the central shaft portion 153; the other closure portion 163 formed integrally with respective one axial end portions of the plurality of hollow cylindrical portions 161 and 162; and the recess 26 provided in an axial end face of the closure portion 163. The hollow cylindrical portion 161 on the innermost peripheral side between the plurality of hollow cylindrical portions 161 and 162 is fittingly secured to the other axial end portion 160 of the central shaft portion 153 with serration (projection/recess) coupling.

In the damper 2 shown in FIG. 7 and having such a fixing member 12, the rotator 11 constituted by an integral member includes two sets of pluralities of hollow cylindrical portions 171, 172, and 173 as well as 174, 175, and 176 which are disposed concentrically with the central shaft portion 153 and are arranged in the axial direction; and an annular closure portion 177 which is disposed between the two sets of pluralities of hollow cylindrical portions 171, 172, and 173 as well as 174, 175, and 176 and is formed integrally with respective ones of the two sets of pluralities of hollow cylindrical portions 171, 172, and 173 as well as 174, 175, and 176. The rotator 11 is supported rotatably by the central shaft portion 153 between the two members 151 and 152 of the fixing member 12. Both pluralities of hollow cylindrical portions 155 and 156 as well as 161 and 162 of the fixing member 12 and the two sets of pluralities of hollow cylindrical portions 171, 172, and 173 as well as 174, 175, and 176 are overlappingly fitted to each other in the radial direction with the gap 13 in which the silicone-based unvulcanized rubber 15 is densely disposed.

In the damper 2 shown in FIG. 7, the coil spring 74 of the one-way clutch means 16 has one end portion 72 formed as a free end and wound around a cylindrical outer peripheral surface 178 of the rotator 11, specifically around the outer peripheral surface 178 of the hollow cylindrical portions 173 and 176 and the closure portion 177, the other end portion 71 curved in loop form being adapted to be attached to the automobile rear seat 3 through the arm member 91 of the hinge mechanism 82.

In the same way as the damper 2 shown in FIG. 1, the damper 2 shown in FIG. 7 is secured at its mounting portion 46 to the mounting portion 93 of the bracket 83 by means of the fixing bolts 44, and is supported by the arm member 91 at the recess 26 via the shaft member 24 fitted in the recess 26.

Also in the automobile seat mechanism 1 having the damper 2 shown in FIG. 7, in the lateral rotation R1 in the raising direction of the rear seat 3, the coil spring 74 which is rotated in the same direction through the arm member 91 is adapted to undergo enlargement in diameter at the portion where it is in contact with and wound around the outer peripheral surface 178. As a result, the coil spring 74 idles with respect to the outer peripheral surface 178, does not transmit the lateral rotation R1 in the raising direction of the rear seat 3 to the rotator 11, and does not allow the relative rotation in the direction of the lateral rotation R1 about the axis X to be produced between the rotator 11 and the fixing member 12. It is thereby ensured that the damping function based on the silicone-based unvulcanized rubber 15 is not produced; therefore, it is possible to easily effect the springing up of the rear seat 3 in the lateral direction. On the other hand, in the lateral rotation R1 in the lowering direction of the rear seat 3, the coil spring 74 which is rotated in the same direction through the arm member 91 is adapted to undergo shrinkage in diameter at the portion where it is in contact with and wound around the outer peripheral surface 178. As a result, the coil spring 74 is tightly wound around the outer peripheral surface 178, transmits the lateral rotation R1 in the lowering direction of the rear seat 3 to the rotator 11, and allows the relative rotation in the direction of the lateral rotation R1 about the axis X to be produced between the rotator 11 and the fixing member 12. It is thereby ensured that the silicone-based unvulcanized rubber 15 is made to undergo shear deformation, allowing the rotational energy of the rear seat 3 to be absorbed by the shear deformation of the silicone-based unvulcanized rubber 15. Therefore, it is possible to avoid sudden lateral rotation R1 in the returning and lowering direction of the rear seat 3, eliminate the sudden returning of the rear seat 3, and eliminate the generation of a large unpleasant noise due to a violent collision against the stopper or the like. Further, since the damping function can be obtained by the shear deformation of the silicone-based unvulcanized rubber 15, there is no possibility of wear, the seal for leakage prevention can be omitted, and it is possible to easily obtain a large damping force even with a lightweight and compact damper. At the same time, the rotator 11 is supported at its recess 26 by the arm member 91 through the shaft member 24, while the fixing member 12 is supported at its mounting portion 46 by the mounting portion 93, such that the damper 2 is supported at its both ends. Therefore, the damper 2 is firmly fixed to the chassis.

Figure 8:
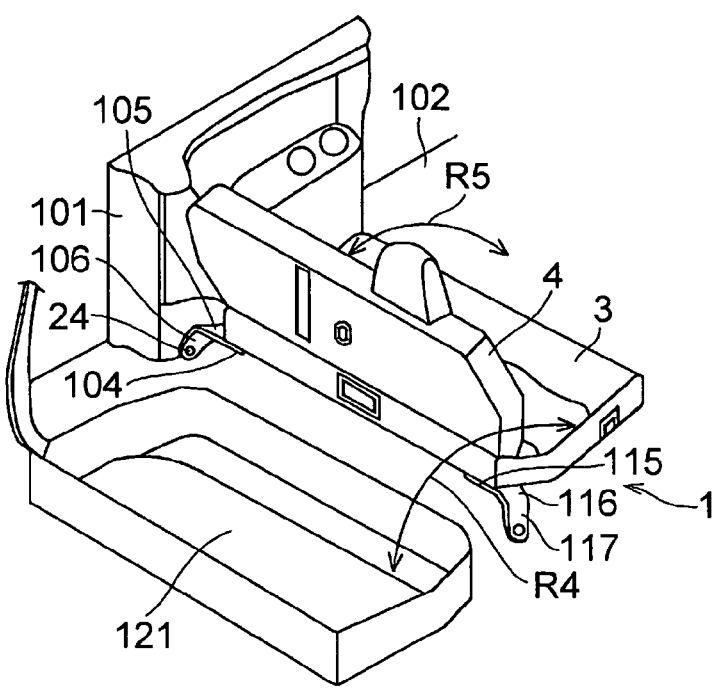
FIG. 8 is an explanatory cross-sectional view of still another preferred embodiment of the invention.

Incidentally, although described above is the example of the automobile seat mechanism 1 in which the rear seat 3 is installed rotatably in the directions of the lateral rotation R1, the damper 2 may alternatively be used in the automobile seat mechanism 1 in which the rear seat 3 is installed rotatably in back-and-forth directions R4, as shown in FIG. 8.

In the automobile seat mechanism 1 shown in FIG. 8, the damper 2 is accommodated in a side frame 101, and the fixing member 12 of the damper 2 has its mounting portion 46 secured to the automobile chassis by being secured to the side frame 101 or a floor plate 102 of the automobile. The shaft member 24 disposed in the recess 26 and supported rotatably by the side frame 101 is inserted and secured in a hole of the other end 106 of a seat bracket 105 secured at one end 104 thereof to the rear seat 3, and rotatably supports the seat bracket 105. The other end portion 71 of the coil spring 74 curved in loop form is attached to a pin (not shown) which is embedded in the other end 106 of the seat bracket 105, is passed through a circular arc-shaped elongated hole of the side frame 101, and extends into the side frame 101. The rotation in back-and-forth direction R4 of the rear seat 3 is adapted to be transmitted to the other end portion 71 of the coil spring 74 through the seat bracket 105, so that the backrest 4 is provided rotatably in a forward direction R5 relative to the rear seat 3. The other seat bracket 116 secured at one end 115 thereof to the rear seat 3 is supported at the other end 117 thereof to the other side frame (not shown) of the automobile through a shaft and the like so as to be rotatable in the back-and-forth directions R4.

Figure 9:
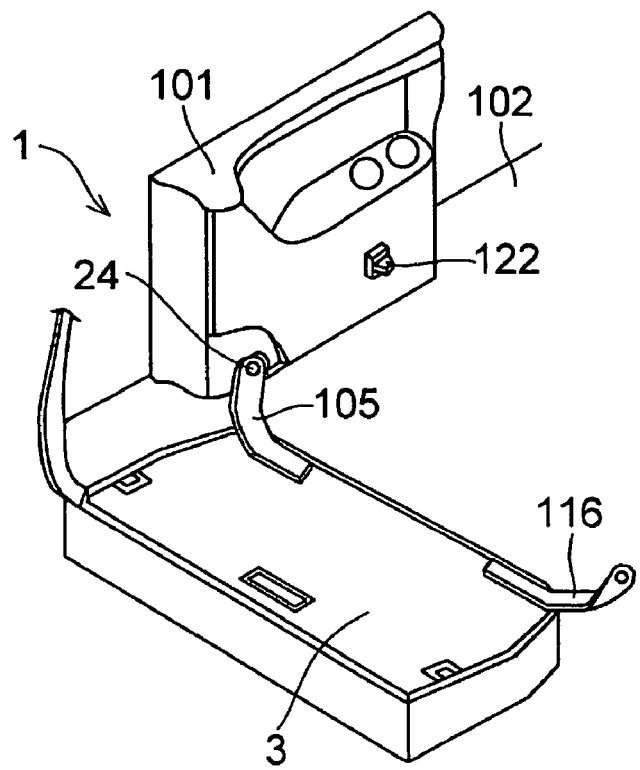
FIG. 9 is a diagram explaining the operation of the embodiment shown in FIG. 8.

Further, with the automobile seat mechanism 1 shown in FIG. 8, after the backrest 4 is rotated in the forward direction R5 and is superposed on the rear seat 3 (after being folded), the rear seat 3 is rotated in the backward direction in the back-and-forth directions R4 and is then further rotated in the lowering direction, so as to be accommodated in a recess 121 formed in the floor plate 102 of the automobile. Hence, it is possible to provide a large accommodating space inside the vehicle compartment, as shown in FIG. 9. In addition, in the state shown in FIG. 9, after the rear seat 3 is rotated in the raising direction so as to be brought out from the recess 121, the rear seat 3 is rotated in the forward direction in the back-and-forth directions R4, and is abutted against a stopper 122 attached to the side frame 101. Subsequently, if the backrest 4 is rotated, the rear seat 3 can be returned to its original state.

With the automobile seat mechanism 1 shown in FIG. 8, the coil spring 74 is adapted to undergo shrinkage in diameter in the backward rotation of the rear seat 3 including the lowering direction in the back-and-forth directions R4, and is adapted to undergo enlargement in diameter in the forward rotation of the rear seat 3 including the raising direction in the back-and-forth directions R4. Thus, in this embodiment, in the backward rotation of the rear seat 3 in the back-and-forth directions R4, the one-way clutch means 16 is adapted to transmit that backward rotation to the rotator 11 and causes rotation in the rotator 11, thereby allowing the relative rotation to be produced between the rotator 11 and the fixing member 12 on the basis of the backward rotation including the lowering direction in the back-and-forth directions R4. On the other hand, in the forward rotation of the rear seat 3 including the raising direction in the back-and-forth directions R4, the one-way clutch means 16 is adapted to inhibit the transmission of that forward rotation to the rotator 11 so as not to cause relative rotation between the rotator 11 and the fixing member 12 on the basis of the forward rotation including the raising direction in the back-and-forth directions R4. In other words, the silicone-based unvulcanized rubber 15 is adapted to undergo shear deformation in the backward rotation of the rear seat 3 including the lowering direction in the back-and-forth directions R4, whereas the silicone-based unvulcanized rubber 15 is adapted not to undergo shear deformation in the forward rotation of the rear seat 3 including the raising direction in the back-and-forth directions R4.

Although in the automobile seat mechanism 1 shown in FIG. 8, the damper 2 is accommodated in the side frame 101, the damper 2 may alternatively be installed outside the side frame 101, or the damper 2 may be installed also on the other seat bracket 116 side.

In addition, although in each of the above-described dampers 2, the recess 26 is provided in the closure portions 25 and 163, and the shaft member 24 is fitted in the recess 26, instead of such a recess 26 a projection may be provided on each of the closure portions 25 and 163, and this projection may be used as the shaft member 24.

Figure 10:
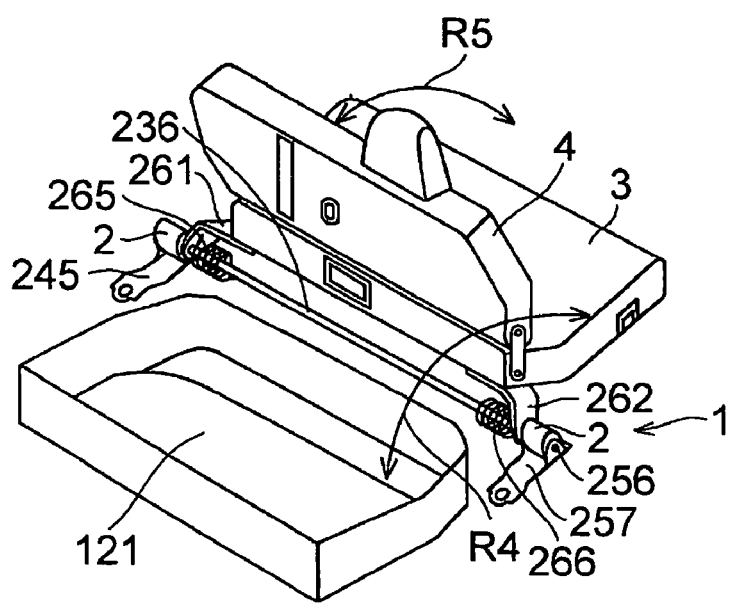
FIG. 10 is an explanatory diagram of a further preferred embodiment of the invention.
Figure 11:
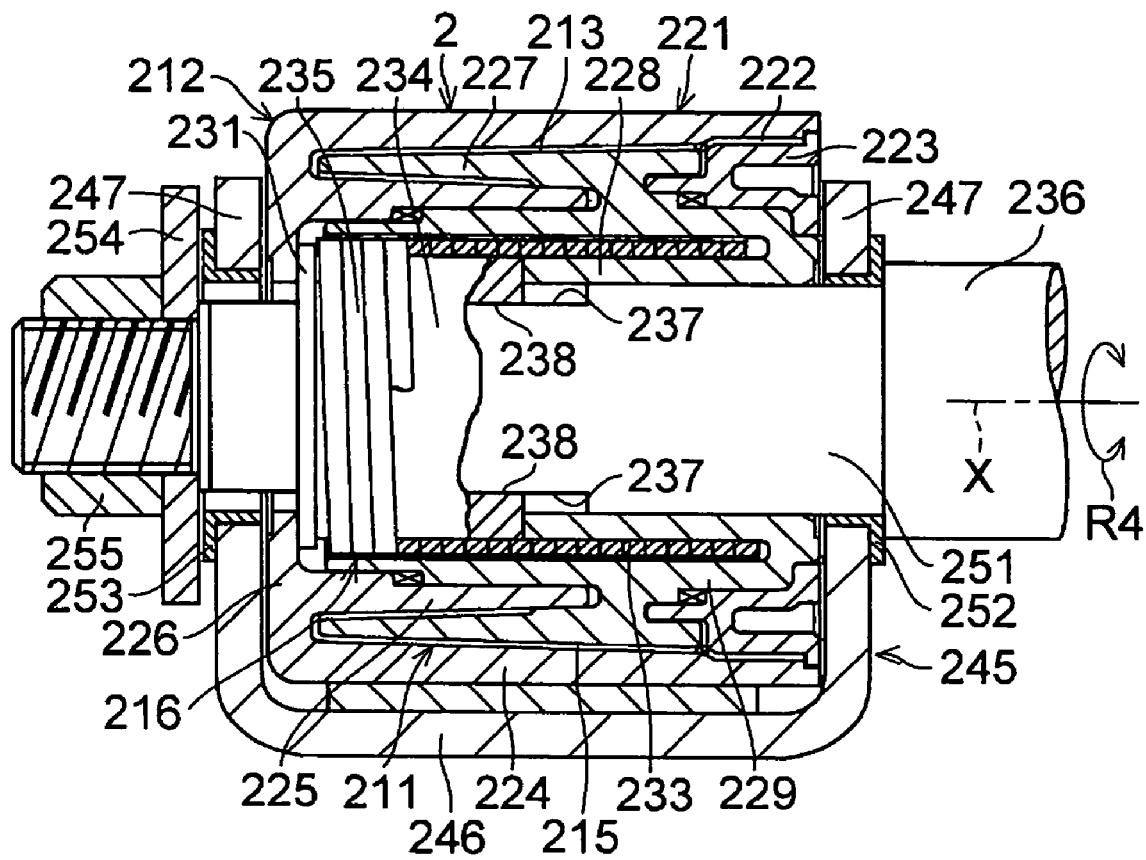
FIG. 11 is an explanatory partly enlarged cross-sectional view of the embodiment shown in FIG. 10.
Figure 12:
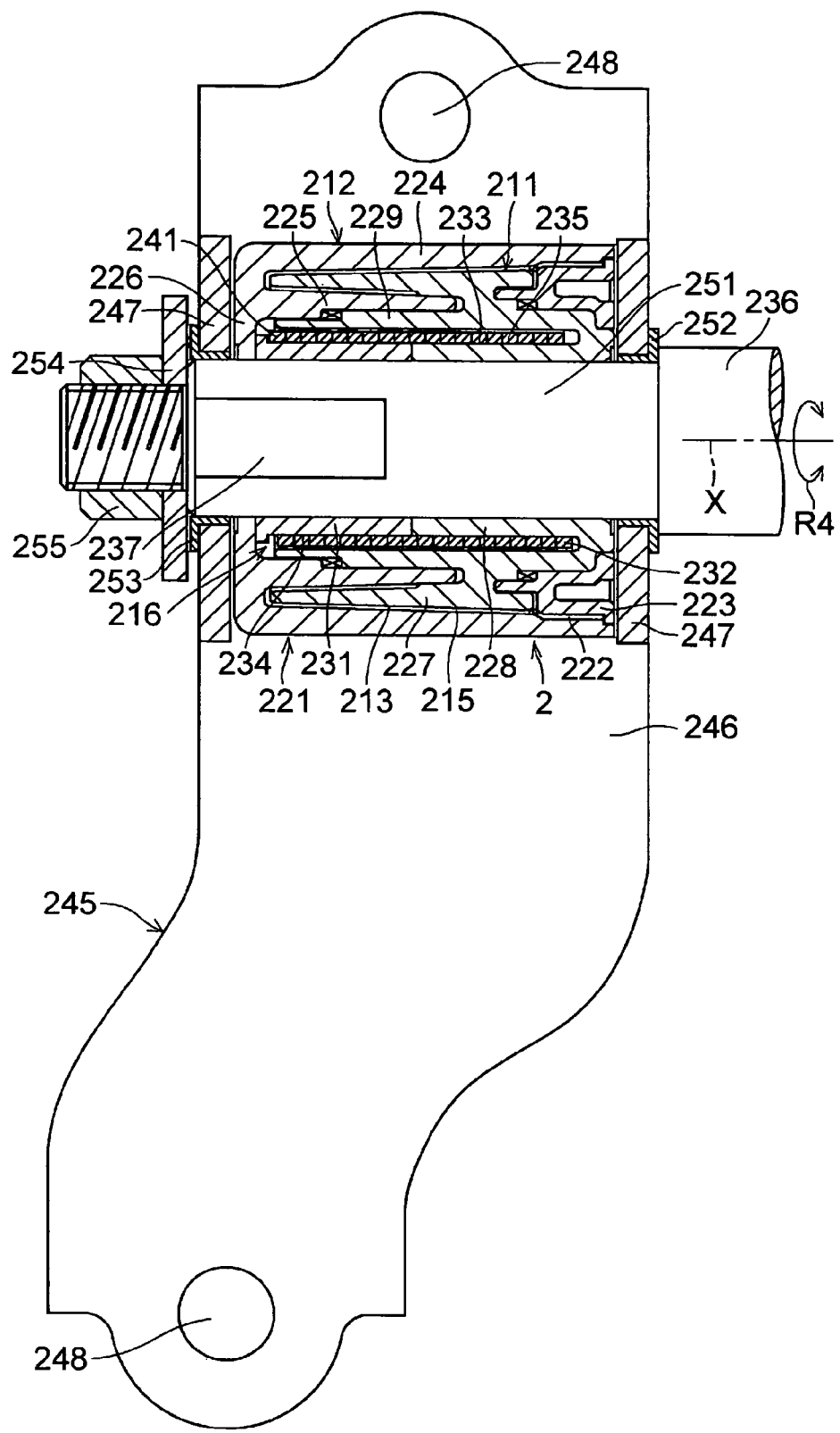
FIG. 12 is an explanatory partly enlarged cross-sectional view of the embodiment shown in FIG. 10.

Further, the automobile seat mechanism 1 and the damper 2 may be constructed, as shown in FIGS. 10 to 12. The damper 2 shown in FIGS. 10 to 12 includes a fixing member 212; a rotator 211 which is rotatable in the back-and-forth directions R4 relative to the fixing member 212 and forms a gap 213 with the fixing member 212; a silicone-based unvulcanized rubber 215 disposed in the gap 213; and a one-way clutch means 216 which, in the backward rotation of the rear seat 3 in the back-and-forth directions R4, is adapted to transmit that backward rotation to the rotator 211 to cause rotation in the rotator 211, and which, in the forward rotation of the rear seat 3 in the back-and-forth directions R4, is adapted to inhibit the transmission of that forward rotation to the rotator 211.

The fixing member 212, which is adapted to be fixed to the chassis on which the rear seat 3 is installed rotatably in the back-and-forth directions R4, includes a housing member 221, as well as an annular cover member 223 which is threadedly secured or fittingly secured, i.e., threadedly secured through a threaded portion 222 in this embodiment, to the housing member 221. The housing member 221 includes an outer hollow cylindrical portion 224; an inner hollow cylindrical portion 225 disposed concentrically with the outer hollow cylindrical portion 224 on the inner side of the outer hollow cylindrical portion 224; and an annular plate-shaped closure portion 226 which is formed integrally on the outer hollow cylindrical portion 224 and the inner hollow cylindrical portion 225 so as to close one axial end portions of the outer hollow cylindrical portion 224 and the inner hollow cylindrical portion 225. The cover member 223 is threadedly secured to an inner peripheral surface of the other end portion in the direction of the axis X of the outer hollow cylindrical portion 224 through the threaded portion 222. The rotator 211 includes an outer peripheral hollow cylindrical portion 227 disposed concentrically with the outer hollow cylindrical portion 224 on the inner side of the outer hollow cylindrical portion 224 and on the outer side of the inner hollow cylindrical portion 225; an inner peripheral hollow cylindrical portion 228 connected to the outer peripheral hollow cylindrical portion 227 and disposed concentrically with the outer peripheral hollow cylindrical portion 227 on the inner side of the inner hollow cylindrical portion 225; and an intermediate hollow cylindrical portion 229 disposed concentrically with the outer peripheral hollow cylindrical portion 227 and disposed intermediate between the outer peripheral hollow cylindrical portion 227 and the inner peripheral hollow cylindrical portion 228 and on the inner side of the inner hollow cylindrical portion 225. The outer hollow cylindrical portion 224, the inner hollow cylindrical portion 225, and the outer peripheral hollow cylindrical portion 227 are overlappingly fitted to each other in the radial direction with the gap 213 in which the silicone-based unvulcanized rubber 215 is disposed. The intermediate hollow cylindrical portion 229 and the inner hollow cylindrical portion 225 are overlappingly fitted to each other in the radial direction. It should be noted that such an intermediate hollow cylindrical portion 229 and the inner hollow cylindrical portion 225 may be overlappingly fitted to each other in the radial direction with a gap in which the silicone-based unvulcanized rubber 215 is disposed.

The one-way clutch means 216 includes a collared hollow cylindrical body 231 juxtaposed to the inner peripheral hollow cylindrical portion 228 in the direction of the axis X, as well as a coil spring 235 having one end portion 232 formed as a free end and wound around respective hollow cylindrical outer peripheral surfaces 233 and 234 of the inner peripheral hollow cylindrical portion 228 and the hollow cylindrical body 231. The hollow cylindrical body 231 has on its inner peripheral surface a pair of flat surfaces 238 which oppose each other, so as to engage flat surfaces (two side portions) 237 formed on one end portion 251 of a shaft member 236 which is inserted into its interior and to be rotated together with the shaft member 236.

The coil spring 235 has an inside diameter of such a measure as to tighten the outer peripheral surface 234 of the hollow cylindrical body 231, and its other end portion 241 is also formed as a free end in this embodiment. Alternatively, the coil spring 235 may be secured and connected to the hollow cylindrical body 231 at the other end portion 241.

The fixing member 212 is secured at its outer hollow cylindrical portion 224 to a base portion 246 of a mounting member 245 by means of bolts, welding, or the like. The mounting member 245 has, in addition to the base portion 246, a pair of shaft supporting portions 247 formed integrally with the base portion 246. The mounting member 245 is secured to the automobile chassis through bolts or the like inserted in bolt holes 248. The fixing member 212 is adapted to be fixed through such a mounting member 245 to the chassis on which the rear seat 3 is rotatably installed.

The shaft member 236 at its one end portion 251 having the flat surfaces 237 is passed through the damper 2 and the pair of shaft supporting portions 247, and is supported by the pair of shaft supporting portions 247 through collared bushes 252 and 253 rotatably in the back-and-forth directions R4. A nut 255 is secured to the one end portion 251 through a washer 254 so that the one end portion 251 does not come off the damper 2 and the shaft supporting portion 247. In the same way as the one end portion 251, the other end portion 256 of the shaft member 236 is also supported through another mounting member 257 rotatably in the back-and-forth directions R4. The mounting member 257 is secured to the automobile chassis through bolts or the like in the same way as the mounting member 245.

The shaft member 236 on its one end portion 251 side is passed through a hole in the other end of a seat bracket 261 having one end secured to the rear seat 3, and is secured to the other end of the seat bracket 261 by welding or the like. Meanwhile, the shaft member 236 on its other end portion 256 side is passed through a hole in the other end of another seat bracket 262 having one end secured to the rear seat 3, and is secured to the other end of the seat bracket 262 by welding or the like. Thus, the rear seat 3 is rotatably installed on the automobile chassis through the shaft member 236 disposed by being passed through the damper 2 as well as the seat brackets 261 and 267, and the shaft member 236 is adapted to be rotated in the same direction in conjunction with the rotation of the rear seat 3 in the back-and-forth direction R4.

A coil spring 265 having one end secured to the seat bracket 261 and the other end secured to the shaft member 236 and a coil spring 266 having one end secured to the seat bracket 262 and the other end secured to the shaft member 236 are disposed over the shaft member 236 concentrically therewith in such a manner as to surround the shaft member 236. The coil spring 265 is adapted to assist by its resiliency the backward rotation of the rear seat 3 in the back-and-forth directions R4, while the coil spring 266 is adapted to assist by its resiliency the forward rotation of the rear seat 3 in the back-and-forth directions R4.

Figure 13:
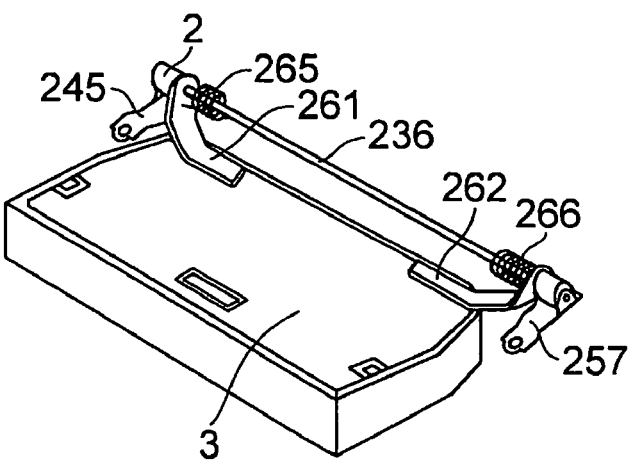
FIG. 13 is a diagram explaining the operation of the embodiment shown in FIG. 10.

In the automobile seat mechanism 1 shown in FIGS. 10 to 12, if the backward rotation of the rear seat 3 in the back-and-forth directions R4 is effected together with the assistance by the resiliency of the coil spring 265 so as to accommodate the rear seat 3 and the backrest 4 in the recess 121, as shown in FIG. 13, the hollow cylindrical body 231 is also rotated in the same direction together with the rotation in the same direction of the shaft member 236. The coil spring 235 disposed to tighten the outer peripheral surface 234 of the hollow cylindrical body 231 undergoes shrinkage in diameter by the rotation of the hollow cylindrical body 231. Consequently, the outer peripheral surface 233 of the inner peripheral hollow cylindrical portion 228 is also tightened by the coil spring 235, which causes the inner peripheral hollow cylindrical portion 228 to rotate together with the backward rotation of the shaft member 236 in the back-and-forth directions R4. As a result, relative rotation occurs between the rotator 211 and the fixing member 212 on the basis of the rotation in the back-and-forth directions R4, so that shear deformation occurs in the silicone-based unvulcanized rubber 215, thereby absorbing the rotational energy of the rear seat 3 by the shear deformation of the silicone-based unvulcanized rubber 215. On the other hand, if the forward rotation of the rear seat 3 in the back-and-forth directions R4 is effected, the hollow cylindrical body 231 is also rotated in the same direction together with the rotation in the same direction of the shaft member 236. The coil spring 235 disposed to tighten the outer peripheral surface 234 of the hollow cylindrical body 231 undergoes shrinkage in diameter by the rotation of the hollow cylindrical body 231. Consequently, the coil spring 235 on the outer peripheral surface 233 of the inner peripheral hollow cylindrical portion 228 also undergoes enlargement in diameter, which causes the hollow cylindrical body 231 to idle with respect to the coil spring 235 and the inner peripheral hollow cylindrical portion 228, so that relative rotation does not occur between the rotator 211 and the fixing member 212. Thus, the damping function based on the silicone-based unvulcanized rubber 15 is not produced, and the forward rotation of the rear seat 3 in the back-and-forth directions R4 is smoothly effected by the assistance based on the resiliency of the coil spring 266.

Thus, with the one-way clutch means 216 as well, in the backward rotation of the rear seat 3 in the back-and-forth directions R4, this backward rotation is transmitted to the rotator 211 to cause rotation in the rotator 211, thereby allowing relative rotation to occur between the rotator 211 and the fixing member 212 on the basis of the backward rotation in the back-and-forth directions R4. On the other hand, in the forward rotation of the rear seat 3 in the back-and-forth directions R4, the transmission of this forward rotation to the rotator 211 is inhibited, to ensure that relative rotation does not occur between the rotator 211 and the fixing member 212 on the basis of the forward rotation in the back-and-forth directions R4. In other words, in the backward rotation of the rear seat 3 in the back-and-forth directions R4, the silicone-based unvulcanized rubber 215 is made to undergo shear deformation, whereas in the forward rotation of the rear seat 3 in the back-and-forth directions R4, the silicone-based unvulcanized rubber 215 is made not to undergo shear deformation.

Further, according to the automobile seat mechanism 1 shown in FIGS. 10 to 12, since the rear seat 3 is rotatably installed on the automobile chassis through the shaft member 236 which is disposed by being passed through the damper 2 and is adapted to be rotated together with the rotation of the rear seat 3, the damper 2 can be disposed compactly around the shaft member 236.

In the automobile seat mechanism 1 shown in FIGS. 10 to 12, instead of providing the damper 2 on only the one end portion 251 side of the shaft member 236, the damper 2 may be similarly provided also on the other end portion 256 side of the shaft member 236.

Figure 14:
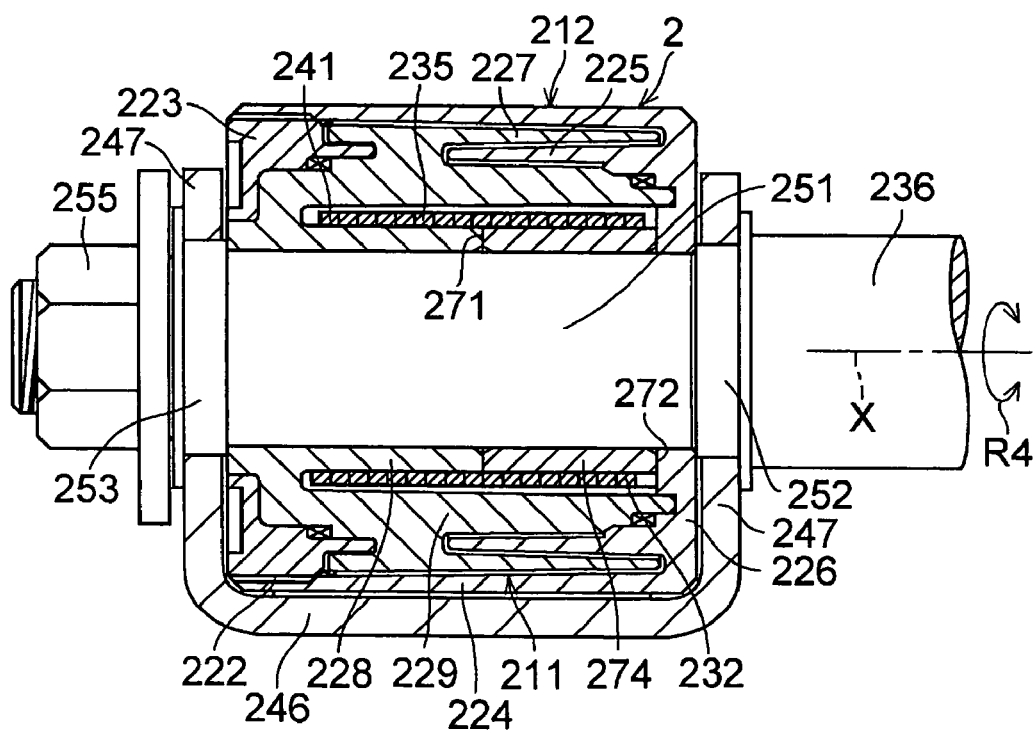
FIG. 14 is an explanatory diagram of a still further preferred embodiment of the invention.
Figure 15:
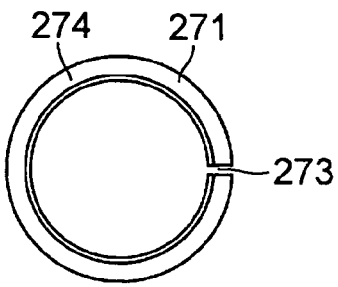
FIG. 15 is an explanatory diagram of a hollow cylinder used in the embodiment shown in FIG. 14.

Incidentally, in the automobile seat mechanism 1 shown in FIGS. 10 to 12, the flat surfaces 237 and the flat surfaces 238 which engage each other are respectively provided on the shaft member 236 and the hollow cylindrical body 231 so as to rotate the hollow cylindrical body 231 together with the rotation of the shaft member 236. Alternatively, it is possible to provide a hollow cylindrical body 274 which has a slit 273 extending from one annular end face 271 to the other annular end face 272 in the direction of the axis X and which is capable of undergoing a reduction in diameter, so that the hollow cylindrical body 274 can be rotated in the back-and-forth directions R4 together with the shaft member 236 by tightening the one end portion 251 of the shaft member 236 inserted in its interior, as shown in FIGS. 14 and 15. Instead of the collared hollow cylindrical body 231, the hollow cylindrical body 274 is juxtaposed to the inner peripheral hollow cylindrical portion 228 in the direction of the axis X. In the automobile seat mechanism 1 shown in FIGS. 10 to 12, as the shaft member 236 rotates, the hollow cylindrical body 274 which tightened the shaft member 236 is also adapted to rotate, and the coil spring-235 wound around the hollow cylindrical body 274 in such a manner as to tighten the hollow cylindrical body 274 is adapted to undergo shrinkage or enlargement in diameter by the rotation of the hollow cylindrical body 274, so as to effect the operation similar to the one described above. It should be noted that in the damper 2 shown in FIG. 14, the cover member 223 is disposed on the nut 255 side, and is fitted to the one end portion 251 of the shaft member 236.

Figure 16:
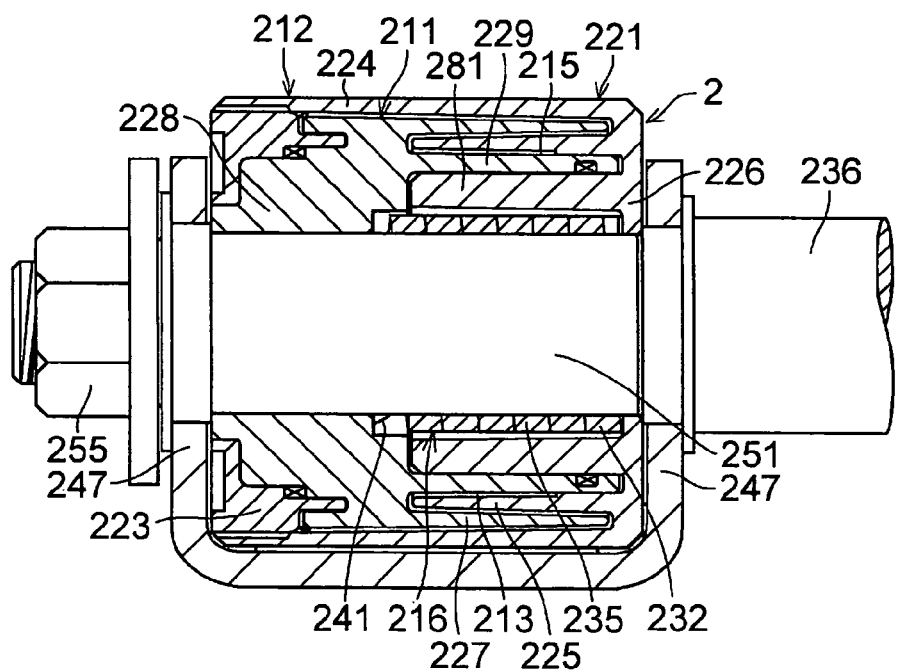
FIG. 16 is an explanatory diagram of a further preferred embodiment of the invention.
Figure 17:
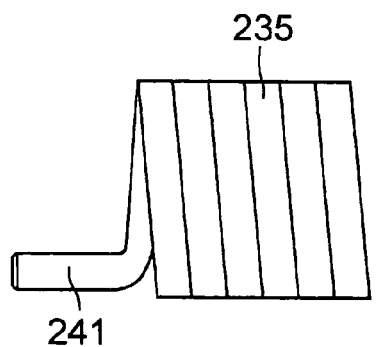
FIG. 17 is an explanatory diagram of a coil spring used in the embodiment shown in FIG. 14.

In addition, as shown in the automobile seat mechanism 1 shown in FIGS. 16 and 17, the hollow cylindrical body 274 may be omitted, and the coil spring 235 may be directly brought into contact with the one end portion 251 of the shaft member 236, while the coil spring 235 may be connected at its other end portion 241 to the inner peripheral hollow cylindrical portion 228 of the rotator 211. In this case, the coil spring 235 has such an inside diameter that the coil spring 235 tightens the one end portion 251 of the shaft member 236 inserted in its interior, and that the one end portion 232 which is its free end is rotated together with the shaft member 236. The housing member 221 has, in addition to the outer hollow cylindrical portion 224 and the inner hollow cylindrical portion 225, a further hollow cylindrical portion 281 which is formed integrally with the closure portion 226 on the inner peripheral side of the inner hollow cylindrical portion 225 and the intermediate hollow cylindrical portion 229 concentrically therewith and in such a manner as to surround the coil spring 235.

With the one-way clutch means 216 having the coil spring 235 shown in FIGS. 16 and 17, in the rotation of the shaft member 236 in the same direction due to the backward rotation of the rear seat 3 in the back-and-forth directions R4, the coil spring 235 is made to undergo shrinkage in diameter, is tightly wound around the one end portion 251 of the shaft member 236, and is rotated together with the rotation of the shaft member 236. As a result, the rotator 211 is rotated in the same direction. On the other hand, in the rotation of the shaft member 236 in the same direction due to the forward rotation of the rear seat 3 in the back-and-forth directions R4, the coil spring 235 is made to undergo enlargement in diameter, and is loosely wound around the one end portion 251 of the shaft member 236. As a result, the shaft member 236 is idled with respect to the coil spring 235, thereby preventing the transmission of the forward rotation of the rear seat 3 in the back-and-forth directions R4 to the rotator 211.

As in the damper 2 shown in FIGS. 16 and 17, the intermediate hollow cylindrical portion 229 and the inner hollow cylindrical portion 225 may be overlappingly fitted to each other in the radial direction with the gap 213 in which the silicone-based unvulcanized rubber 215 is disposed.

Also with the damper 2 having the one-way clutch means 216 shown in FIGS. 16 and 17 and the automobile seat mechanism 1 having such a damper 2, it is possible to obtain advantages similar to those described above, and since the hollow cylindrical body 231 or 274 can be omitted, a further reduction in cost can be attained.

The invention claimed is:

1. A damper for an automobile seat comprising: a fixing member adapted to be fixed to a chassis on which an automobile seat is rotatably installed; a rotator which is rotatable relative to said fixing member and forms a gap with said fixing member; a silicone-based unvulcanized rubber disposed in the gap; and a one-way clutch which, in the rotation of the automobile seat in one direction, is adapted to transmit the rotation in the one direction to said rotator, and which, in the rotation of the automobile seat in another direction, is adapted to inhibit the transmission of the rotation in the other direction to said rotator, said fixing member being constituted by two members, one of said members having a central shaft portion and a plurality of hollow cylindrical portions disposed concentrically on one axial end portion side of the central shaft portion, another one of said members having a plurality of other hollow cylindrical portions disposed concentrically on another axial end portion side of the central shaft portion, the innermost hollow cylindrical portion of said plurality of other hollow cylindrical portions is fittingly secured with respect to the other axial end portion of the central shaft portion, said rotator including two sets of pluralities of hollow cylindrical portions disposed concentrically with the central shaft portion and arranged in an axial direction and a closure portion disposed between said two sets of pluralities of hollow cylindrical portions and formed integrally with respective ones of said two sets of pluralities of hollow cylindrical portions, said rotator being supported rotably by the central shaft portion between said two members of said fixing member, and both pluralities of hollow cylindrical portions of said fixing member and said two sets of pluralities of hollow cylindrical portions being overlappingly fitted to each other in the radial direction with the gap in which said silicone-based unvulcanized rubber is disposed.

2. The damper for an automobile seat according to claim 1, wherein said fixing member is adapted to be fixed to the chassis on which the automobile seat is installed rotatably in raising and lowering directions, and wherein in the lateral rotation of the automobile seat in the lowering direction, said one-way clutch is adapted to transmit the lateral rotation in the lowering direction to said rotator so as to cause said rotator to rotate, whereas in the lateral rotation of the automobile seat in the raising direction, said one-way clutch is adapted to inhibit the transmission of the lateral rotation in the raising direction to said rotator.

3. The damper for an automobile seat according to claim 1, wherein said fixing member is adapted to be fixed to the chassis on which the automobile seat is installed rotatably in back-and-forth directions, and wherein in the backward rotation of the automobile seat, said one-way clutch is adapted to transmit the backward rotation to said rotator so as to cause said rotator to rotate, whereas in the forward rotation of the automobile seat, said one-way clutch is adapted to inhibit the transmission of the forward rotation to said rotator.

4. The damper for an automobile seat according to claim 1, wherein said one member of said fixing member has a closure portion formed integrally with the one axial end portion of the central shaft portion and respective one axial end portions of the plurality of hollow cylindrical portions, as well as a mounting portion formed integrally with said closure portion so as to be fixed to the chassis, and said other member of said fixing member has another closure portion formed integrally with the respective one axial end portions of the plurality of other hollow cylindrical portions, as well as a recess or a projection provided in or on an axial end face of said closure portion.

5. The damper for an automobile seat according to claim 1, wherein said one-way clutch has a coil spring whose one end portion is formed as a free end and wound around a cylindrical outer peripheral surface of said rotator and whose other end portion is adapted to be attached to an automobile rear seat.

6. The damper for an automobile seat according to claim 1, wherein said silicone-based unvulcanized rubber has a degree of plasticity of 30 to 420.

7. The damper for an automobile seat according to claim 1, wherein said silicone-based unvulcanized rubber has a degree of plasticity of 60 to 320.

8. The damper for an automobile seat according to claim 1, wherein said silicone-based unvulcanized rubber has a degree of plasticity of 160 to 320.

9. The damper for an automobile seat according to claim 1, wherein said silicone-based unvulcanized rubber has a Mooney viscosity of 10 to 150 ML 1+4(100° C.).

10. The damper for an automobile seat according to claim 1, wherein said silicone-based unvulcanized rubber has a Mooney viscosity of 36 to 72 ML 1+4(100° C.).

11. The damper for an automobile seat according to claim 1, wherein said silicone-based unvulcanized rubber has a Mooney viscosity of 66 to 72 ML 1+4(100° C.).

12. The damper for an automobile seat according to claim 1, wherein said silicone-based unvulcanized rubber is constituted by a silicone-modified ethylene propylene rubber.

13. An automobile seat mechanism comprising: said damper for an automobile seat according to claim 1; a seat provided rotatably with respect to the automobile chassis; and a backrest provided rotatably with respect to said seat.

14. The automobile seat mechanism according to claim 13, wherein said backrest is provided rotatably in a backward direction with respect to said seat.

15. The automobile seat mechanism according to claim 13, wherein said backrest is provided rotatably in a forward direction with respect to said seat.

16. The automobile seat mechanism according to claim 13, wherein said seat is provided rotatably with respect to the automobile chassis through a shaft member disposed in such a manner as to be passed through said damper, and said shaft member is adapted to be rotated together with the rotation of said seat.

17. A damper for an automobile seat comprising: a fixing member adapted to be fixed to a chassis on which an automobile seat is rotatably installed; a rotator which is rotatable relative to said fixing member and forms a gap with said fixing member; a silicone-based unvulcanized rubber disposed in the gap; and a one-way clutch which, in the rotation of the automobile seat in one direction, is adapted to transmit the rotation in the one direction to said rotator, and which, in the rotation of the automobile seat in another direction, is adapted to inhibit the transmission of the rotation in the other direction to said rotator, said fixing member including a housing member and a cover member which is threadedly secured or fittingly secured to said housing member, said housing member including an outer hollow cylindrical portion, an inner hollow cylindrical portion disposed concentrically with the outer hollow cylindrical portion on an inner side of the outer hollow cylindrical portion, and a closure portion formed integrally on the outer hollow cylindrical portion and the inner hollow cylindrical portion so as to close one axial end portion of the outer hollow cylindrical portion and the inner hollow cylindrical portion, said cover member being threadedly secured or fittingly secured to another axial end portion of the outer hollow cylindrical portion, said rotator including an outer peripheral hollow cylindrical portion disposed concentrically with the outer hollow cylindrical portion on an inner side of the outer hollow cylindrical portion and on an outer side of the inner hollow cylindrical portion, an inner peripheral hollow cylindrical portion connected to the outer peripheral hollow cylindrical portion and disposed concentrically with the outer peripheral hollow cylindrical portion on an inner side of the inner hollow cylindrical portion, and the outer peripheral hollow cylindrical portion and at least one of the outer hollow cylindrical portion and the inner hollow cylindrical portion being overlappingly fitted to each other in the radial direction with the gap in which said silicone-based unvulcanized rubber is disposed, said one-way clutch including a hollow cylindrical body juxtaposed to the inner peripheral hollow cylindrical portion in the axial direction, as well as a coil spring having one end portion formed as a free end and wound around respective outer peripheral surfaces of the inner peripheral hollow cylindrical portion and the hollow cylindrical body.

18. The damper for an automobile seat according to claim 17, wherein said fixing member is adapted to be fixed to the chassis on which the automobile seat is installed rotatably in raising and lowering directions, and wherein in the lateral rotation of the automobile seat in the lowering direction, said one-way clutch is adapted to transmit the lateral rotation in the lowering direction to said rotator so as to cause said rotator to rotate, whereas in the lateral rotation of the automobile seat in the raising direction, said one-way clutch is adapted to inhibit the transmission of the lateral rotation in the raising direction to said rotator.

19. The damper for an automobile seat according to claim 17, wherein said fixing member is adapted to be fixed to the chassis on which the automobile seat is installed rotatably in back-and-forth directions, and wherein in the backward rotation of the automobile seat, said one-way clutch is adapted to transmit the backward rotation to said rotator so as to cause said rotator to rotate, whereas in the forward rotation of the automobile seat, said one-way clutch is adapted to inhibit the transmission of the forward rotation to said rotator.

20. The damper for an automobile seat according to claim 17, wherein said rotator further includes an intermediate hollow cylindrical portion disposed intermediate between the outer peripheral hollow cylindrical portion and the inner peripheral hollow cylindrical portion on the inner side of the inner hollow cylindrical portion, and wherein the intermediate hollow cylindrical portion and the inner hollow cylindrical portion are overlappingly fitted to each other in the radial direction with a gap in which said silicone-based unvulcanized rubber is disposed.

21. The damper for an automobile seat according to claim 17, wherein the hollow cylindrical body has on an inner peripheral surface thereof a pair of flat surfaces which oppose each other, so as to engage a shaft member which is inserted into an interior thereof and to be rotated together with the shaft member.

22. The damper for an automobile seat according to claim 17, wherein the hollow cylindrical body has a slit extending from one annular end face thereof to another annular end face thereof in the axial direction and which is capable of undergoing a reduction in diameter, so that the hollow cylindrical body can be rotated together with the shaft member by tightening the shaft member inserted in the interior thereof.

23. The damper for an automobile seat according to claim 17, wherein said coil spring has an inside diameter of such a measure as to tighten the hollow cylindrical body, and the other end portion thereof is also formed as a free end.

24. The damper for an automobile seat according to claim 17, wherein said coil spring is connected at the other end portion thereof to said rotator, and has such an inside diameter that said coil spring tightens said shaft member inserted in the interior thereof, and that the one end portion which is the free end thereof is rotated together with said shaft member.

25. The damper for an automobile seat according to claim 17, wherein said silicone-based unvulcanized rubber has a degree of plasticity of 30 to 420.

26. The damper for an automobile seat according to claim 17, wherein said silicone-based unvulcanized rubber has a degree of plasticity of 60 to 320.

27. The damper for an automobile seat according to claim 17, wherein said silicone-based unvulcanized rubber has a degree of plasticity of 160 to 320.

28. The damper for an automobile seat according to claim 17, wherein said silicone-based unvulcanized rubber has a Mooney viscosity of 10 to 150 ML 1+4(100° C.).

29. The damper for an automobile seat according to claim 17, wherein said silicone-based unvulcanized rubber has a Mooney viscosity of 36 to 72 ML 1+4(100° C.).

30. The damper for an automobile seat according to claim 17, wherein said silicone-based unvulcanized rubber has a Mooney viscosity of 66 to 72 ML 1+4(100° C.).

31. The damper for an automobile seat according to claim 17, wherein said silicone-based unvulcanized rubber is constituted by a silicone-modified ethylene propylene rubber.

32. An automobile seat mechanism comprising: said damper for an automobile seat according to claim 17; a seat provided rotatably with respect to the automobile chassis; and a backrest provided rotatably with respect to said seat.

33. The automobile seat mechanism according to claim 32, wherein said backrest is provided rotatably in a backward direction with respect to said seat.

34. The automobile seat mechanism according to claim 32, wherein said backrest is provided rotatably in a forward direction with respect to said seat.

35. The automobile seat mechanism according to claim 32, wherein said seat is provided rotatably with respect to the automobile chassis through a shaft member disposed in such a manner as to be passed through said damper, and said shaft member is adapted to be rotated together with the rotation of said seat.

* * * * *